US012663740B2

(12) United States Patent
Tanaka et al.

(10) Patent No.: US 12,663,740 B2
(45) Date of Patent: Jun. 23, 2026

(54) IMAGE FORMING APPARATUS WITH CONTROL FOR SETTING TRANSFER BIAS

(71) Applicant: CANON KABUSHIKI KAISHA, Tokyo (JP)

(72) Inventors: Izuru Tanaka, Tokyo (JP); Manato Kobayashi, Chiba (JP); Yusuke Minato, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/585,920

(22) Filed: Feb. 23, 2024

(65) Prior Publication Data

US 2024/0288801 A1 Aug. 29, 2024

(30) Foreign Application Priority Data

Feb. 25, 2023 (JP) ................................ 2023-027857

(51) Int. Cl.
*G03G 15/16* (2006.01)

(52) U.S. Cl.
CPC ..... *G03G 15/1675* (2013.01); *G03G 15/1645* (2013.01); *G03G 15/1605* (2013.01)

(58) Field of Classification Search
CPC ......................... G03G 15/1675; G03G 15/605
See application file for complete search history.

(56) References Cited

U.S. PATENT DOCUMENTS

| | | | | |
|---|---|---|---|---|
| 4,401,383 | A | 8/1983 | Suzuki et al. | |
| 9,400,458 | B2 * | 7/2016 | Yokoyama | G03G 15/6573 |
| 2006/0209151 | A1 | 9/2006 | Tamiya et al. | |
| 2013/0089347 | A1 * | 4/2013 | Murata | G03G 15/1605 399/66 |
| 2024/0168414 | A1 | 5/2024 | Kobayashi et al. | |

FOREIGN PATENT DOCUMENTS

| | | | |
|---|---|---|---|
| EP | 0 549 195 | A1 | 9/1992 |
| JP | 2003-057963 | A | 2/2003 |
| JP | 2006-171536 | A | 6/2006 |
| JP | 2022-133606 | A | 9/2022 |

OTHER PUBLICATIONS

Extended European Search Report dated Jun. 21, 2024, in European Patent Application No. 24156251.1.

* cited by examiner

*Primary Examiner* — Arlene Heredia Ocasio
(74) *Attorney, Agent, or Firm* — Venable LLP

(57) ABSTRACT

An image forming apparatus includes a photosensitive member charged to a predetermined polarity, an intermediary transfer belt, a primary transfer member forming a primary transfer portion, an electrode member in contact with the inner peripheral surface of the photosensitive member on a downstream side, first and second detecting portions to detect a current flowing through or a voltage applied to the primary transfer member and the electrode member, respectively, and a control portion configured to execute, during non-image formation, a setting operation in which the transfer bias to be used during image formation is set. In executing the setting operation, the control portion sets the transfer bias based on a first detecting result detected by the first detecting portion while a voltage is applied to the primary transfer member and a second detecting result detected by the second detecting portion while the voltage is applied to the primary transfer member.

8 Claims, 11 Drawing Sheets

(a)

(b)

IMAGE FORMING APPARATUS WITH CONTROL FOR SETTING TRANSFER BIAS

FIELD OF THE INVENTION AND RELATED ART

The present invention relates to an image forming apparatus, such as a copying machine, a printer, a facsimile machine, or a multi-function machine having a plurality of functions of these machines, of an electrophotographic type or an electrostatic recording type.

As an image forming apparatus, such as a color copying machine, a color printer, or a color multi-function machine, of the electrophotographic type, an image forming apparatus of an intermediary transfer type has become mainstream since the image forming apparatus has advantages such that downsizing of an apparatus main assembly and adaptation to various recording materials are relatively easy. The image forming apparatus of the intermediary transfer type generally includes a constitution provided with a plurality of photosensitive drums and an intermediary transfer belt. In such an image forming apparatus, toner images formed on the photosensitive drums are primarily transferred electrostatically onto the intermediary transfer belt successively in a primary transfer portion, respectively. In addition, the toner images primarily transferred onto the intermediary transfer belt are secondarily transferred electrostatically onto a recording material such as paper in a secondary transfer portion. Incidentally, with respect to arrangement of components around the primary transfer portion, upstream and downstream refer to upstream and downstream in a feeding direction of the intermediary transfer belt, unless otherwise noted.

In the image forming apparatus as described above, for toner on the intermediary transfer belt, charge amount tends to rise by being subjected to electric discharge between the intermediary transfer belt and the photosensitive drum downstream of the primary transfer portion. As the present inventors conducted diligent study, it was found that it becomes difficult to transfer the toner to the recording material in the secondary transfer portion with the charge amount of the toner on the intermediary transfer belt increasing. For example, with secondary transfer electric field required to transfer the toner to the recording material in the secondary transfer portion increasing, graininess of an image may deteriorate, and it may become difficult to transfer the toner uniformly to an embossed paper having an uneven surface, etc.

Here, in Japanese Patent Application Laid-Open No. 2003-57963, a configuration in which a conductive contact plate is provided downstream of a primary transfer portion and on an inner peripheral surface of an intermediary transfer belt, and bias of the same polarity as charge polarity of a photosensitive drum is applied to this contact plate is disclosed.

In order to suppress the increase of the charge amount of the toner downstream of the primary transfer portion as described above, it is effective to suppress the electric discharge downstream of the primary transfer portion. For this purpose, it is effective to reduce potential difference between the photosensitive drum and the intermediary transfer belt after the primary transfer.

In Japanese Patent Application Laid-Open No. 2003-57963, repressing the electric discharge downstream of the primary transfer portion is not disclosed; however, as the present inventors conducted diligent study, it was found that in order to suppress the electric discharge downstream of the primary transfer portion, it is effective to place a potential regulating member, which is a conductive electrode member, downstream of the primary transfer portion and on the inner peripheral surface of the intermediary transfer belt, and to apply the bias of the same polarity as the charge polarity of the photosensitive drum to this potential regulating member.

However, it is found that when the above potential regulating member is used, there is a possibility that leakage current from the primary transfer portion to the potential regulating member occurs, which may reduce primary transfer current required in a direction toward the photosensitive drum in the primary transfer portion, and impair primary transferability.

Therefore, it is required to improve secondary transferability by suppressing the above electric discharge while maintaining the primary transferability. In Japanese Patent Application Laid-Open No. 2003-57963, there is no disclosure about correction of primary transfer bias which takes into account current flowing from the primary transfer portion to the conductive contact plate.

Therefore, a purpose of the present invention is to improve the secondary transferability while maintaining the primary transferability in the configuration in which the bias of the same polarity as the charge polarity of the photosensitive member is applied to an electrode member arranged downstream of the primary transfer portion.

SUMMARY OF THE INVENTION

The above object is achieved with an image forming apparatus according to the present invention. In summary, according to an aspect of the present invention, there is provided an image forming apparatus comprising: a photosensitive member charged to a predetermined polarity and configured to bear a toner image; an intermediary transfer belt on which the toner image is transferred in a primary transfer portion from the photosensitive member; a primary transfer member configured to form the primary transfer portion where the photosensitive member and the intermediary transfer belt are in contact with each other by contacting an inner peripheral surface of the intermediary transfer belt, and to transfer the toner image onto the intermediary transfer belt from the photosensitive member by a transfer bias being applied; an electrode member in contact with the inner peripheral surface of the photosensitive member on a downstream side of the primary transfer portion with respect to a moving direction of the intermediary transfer belt; a first applying portion configured to apply a bias of an opposite polarity to the predetermined polarity to the primary transfer member; a second applying portion configured to apply a bias of the same polarity as the predetermined polarity to the electrode member; a first detecting portion configured to detect a current flowing through or a voltage applied to the primary transfer member; a second detecting portion configured to detect a current flowing through or a voltage applied to the electrode member; and a control portion, during non-image formation, configured to execute a setting operation in which the transfer bias to be set during image formation is set by causing the first applying portion to apply a test bias to the primary transfer member, wherein in executing the setting operation, the control portion sets the transfer bias based on a first detecting result detected by the first detecting portion while a voltage is applied to the primary transfer member and a second detecting result detected by the second detecting portion while the voltage is applied to the primary transfer member.

Further features of the present invention will become apparent from the following description of exemplary embodiments with reference to the attached drawings.

Figure 3:
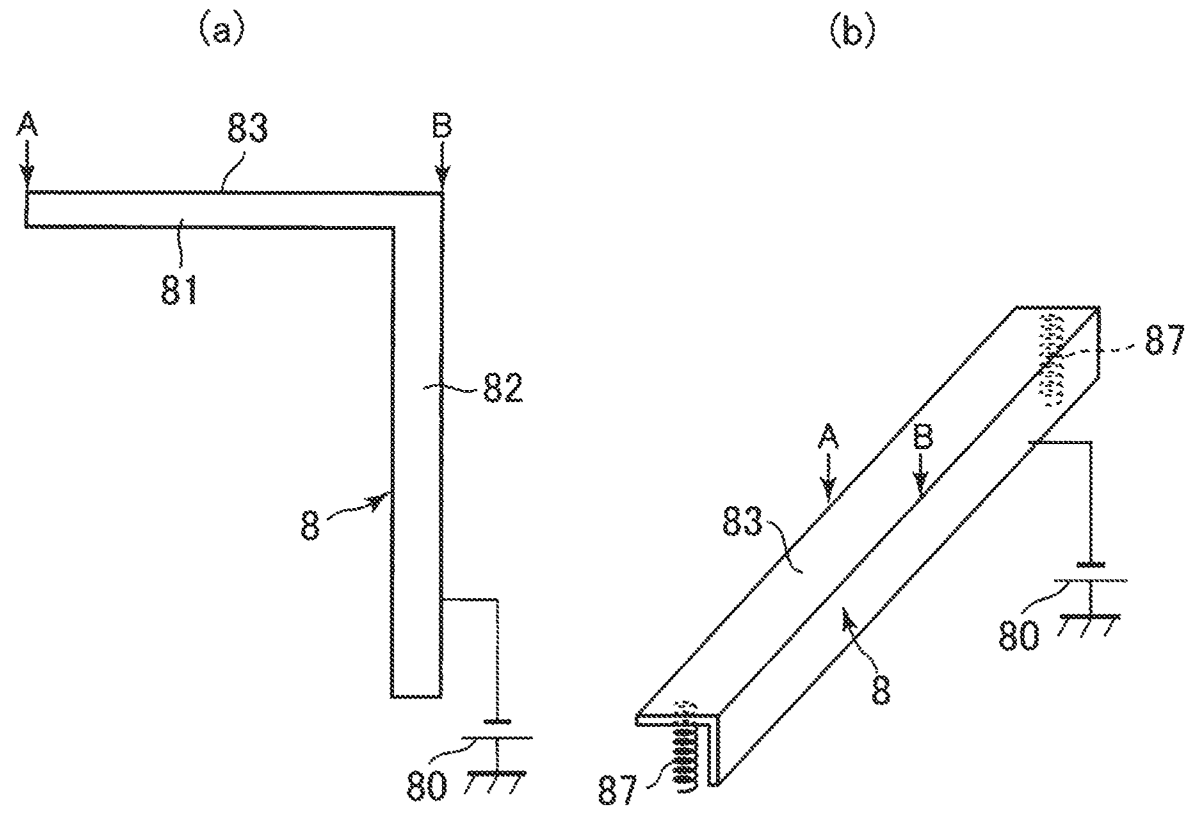

Parts (a) and (b) of FIG. 3 are a sectional view and a perspective view, respectively, of a potential regulating member.

Figure 4:
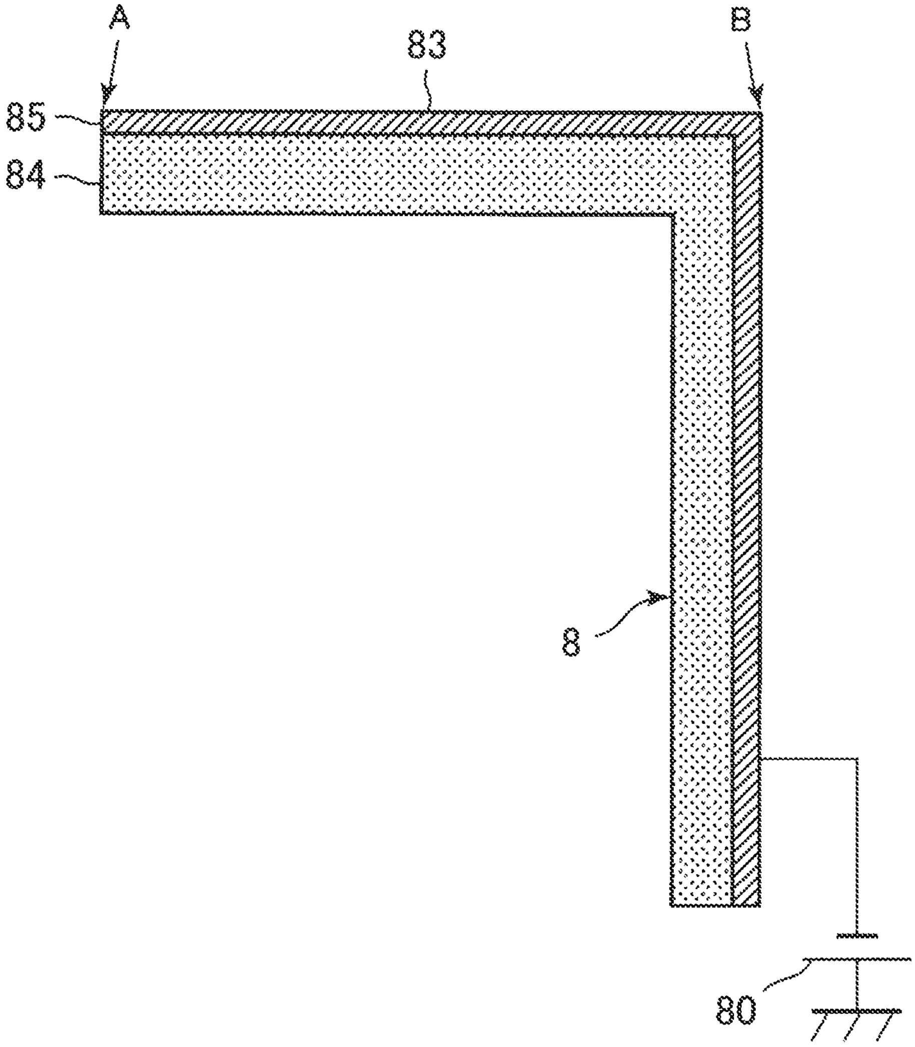

FIG. 4 is a sectional view of the potential regulating member in another example.

Figure 5:
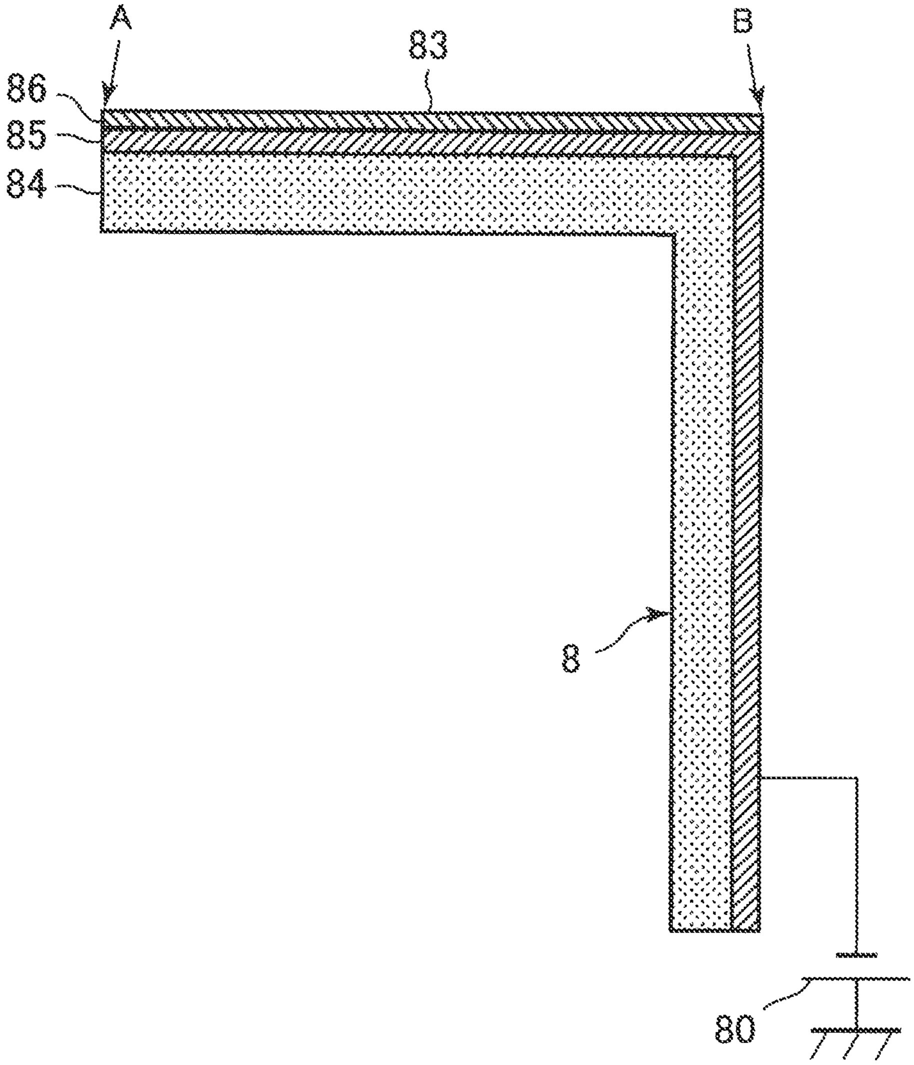

FIG. 5 is a sectional view of the potential regulating member in another example.

Figure 6:
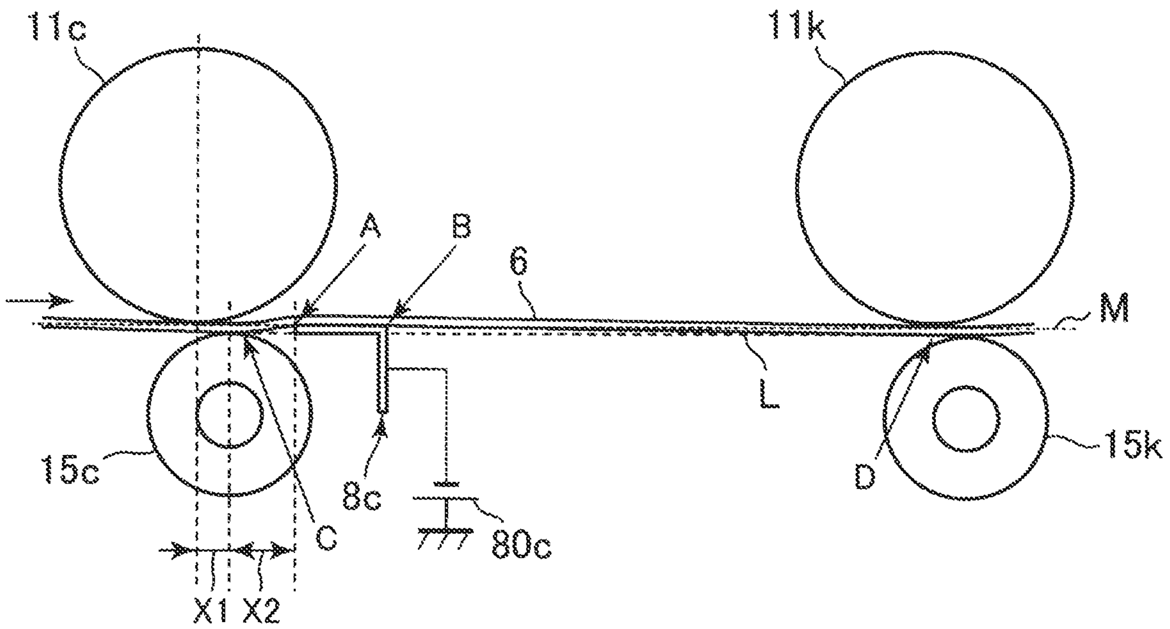

FIG. 6 is a sectional view for illustrating an arrangement of the potential regulating member.

Figure 7:
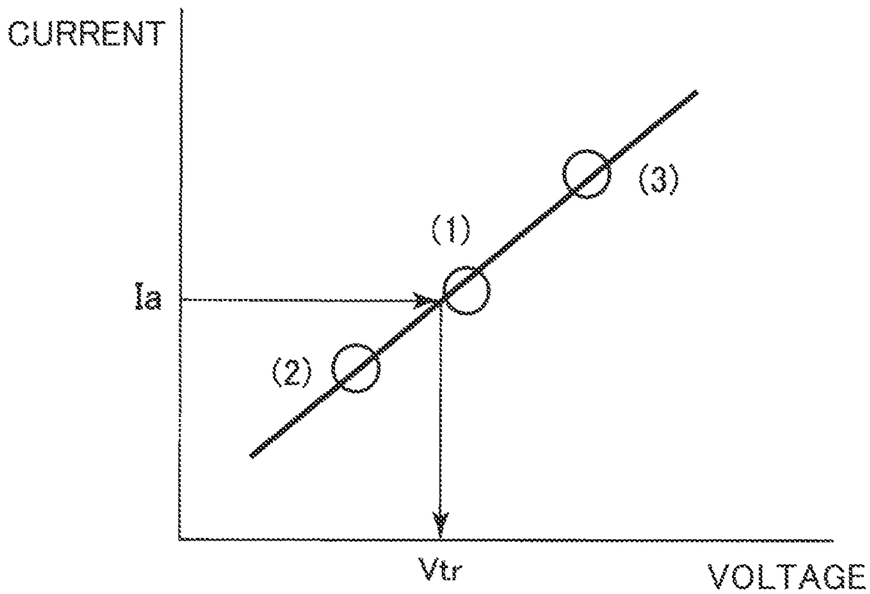
Figure 7:
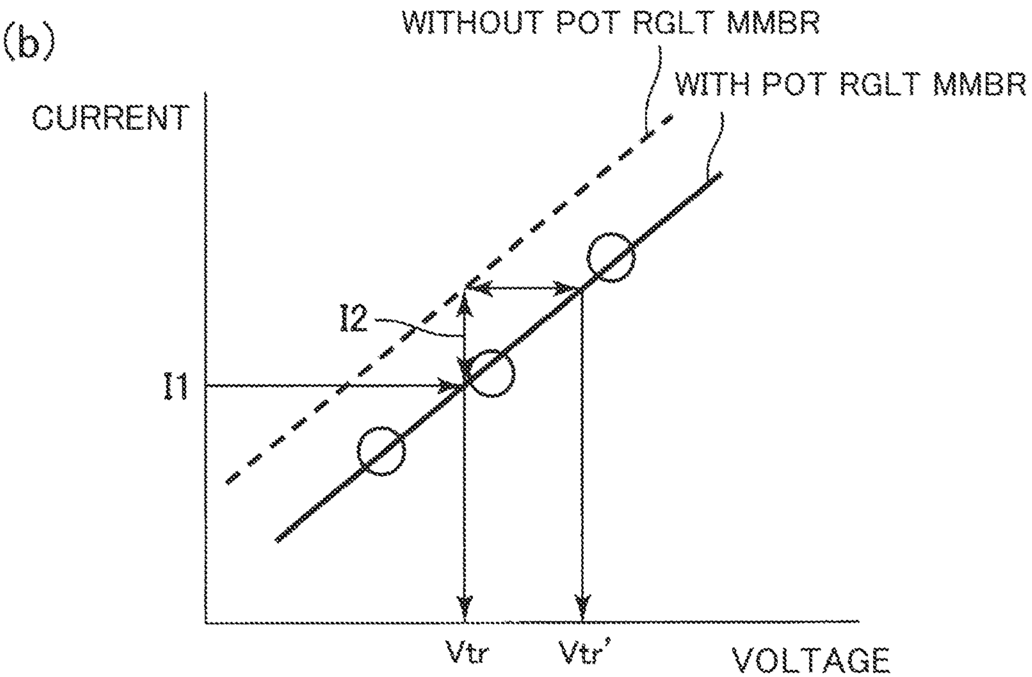

Parts (a) and (b) of FIG. 7 are a schematic graphical diagrams for illustrating an ATVC and correction of primary transfer bias.

Figure 8:
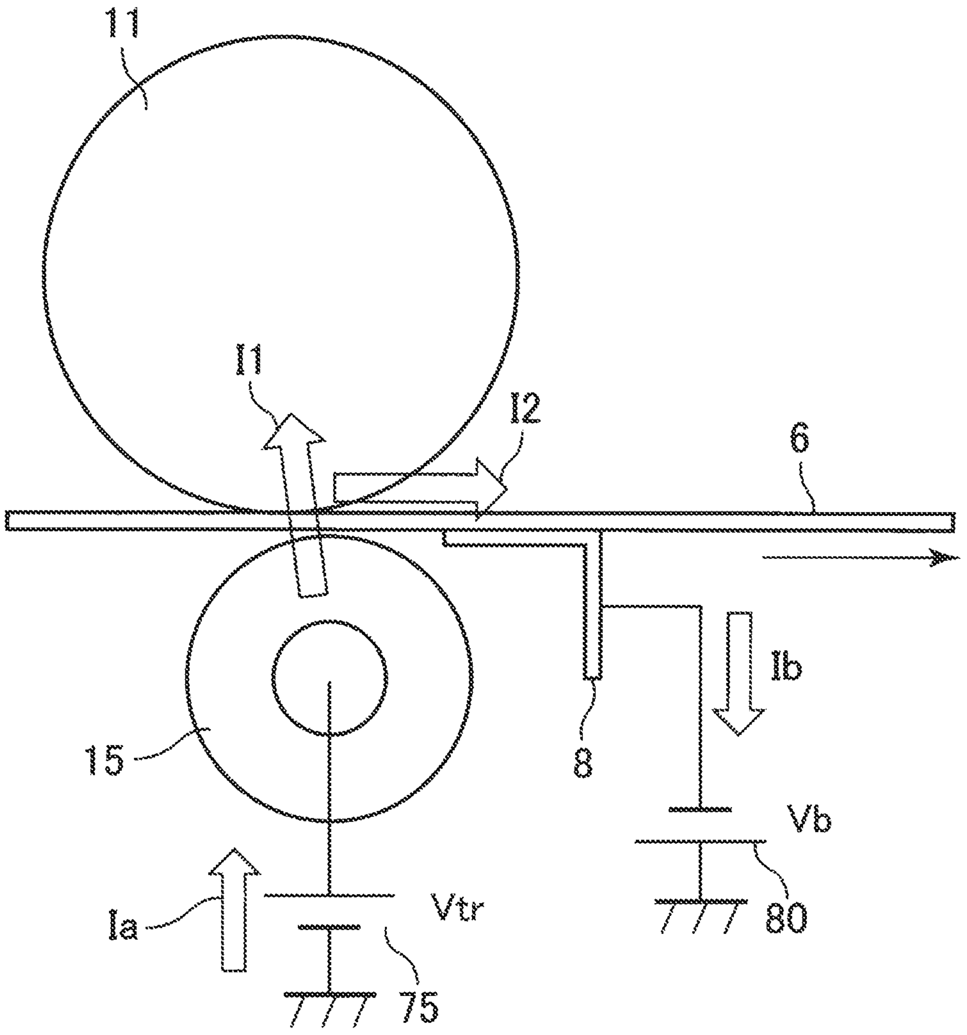

FIG. 8 is a schematic view for illustrating a current path around a primary transfer portion.

Figure 9:
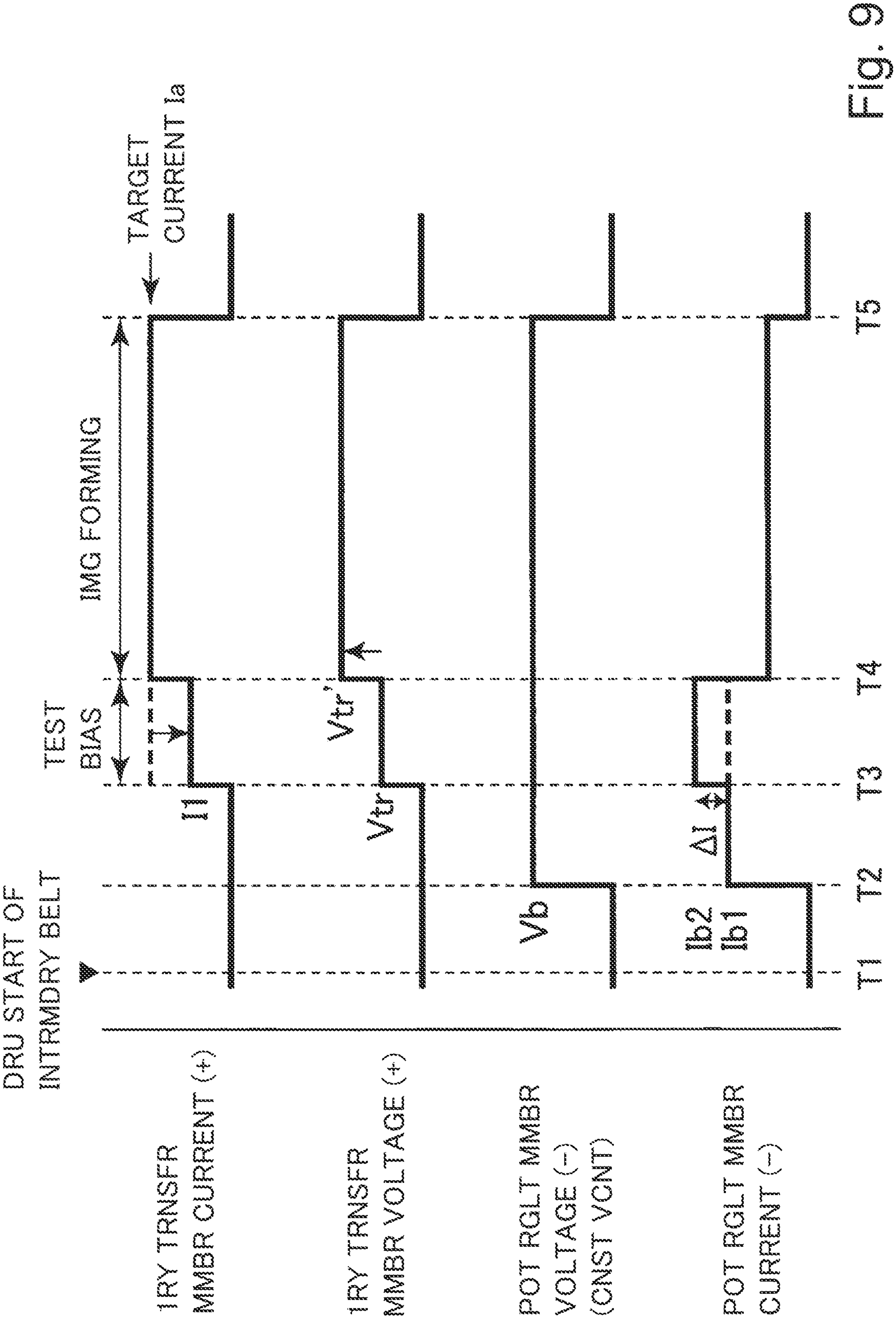

FIG. 9 is a timing chart diagram for illustrating a control of an Embodiment 1.

Figure 10:
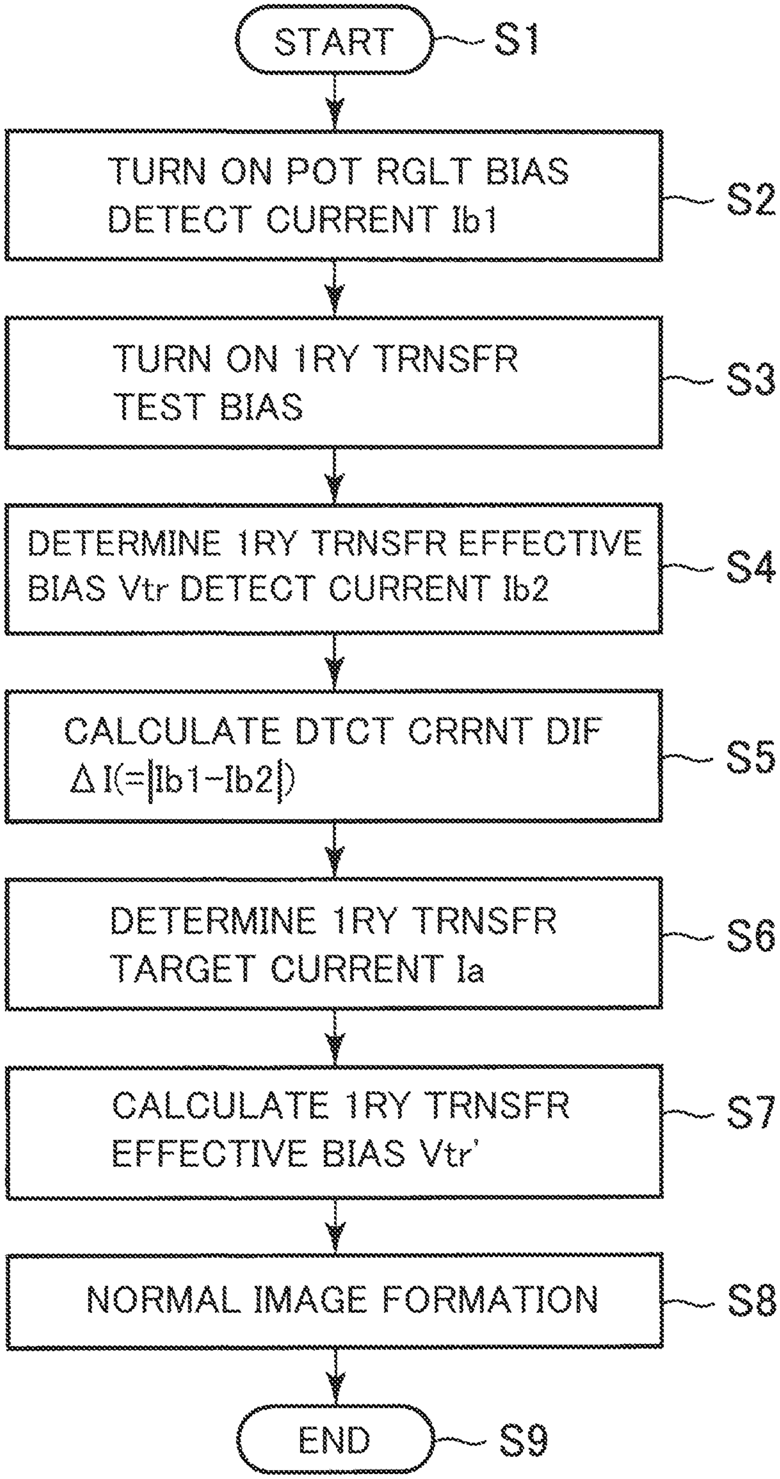

FIG. 10 is a flow chart diagram for illustrating the control of the Embodiment 1.

Figure 11:
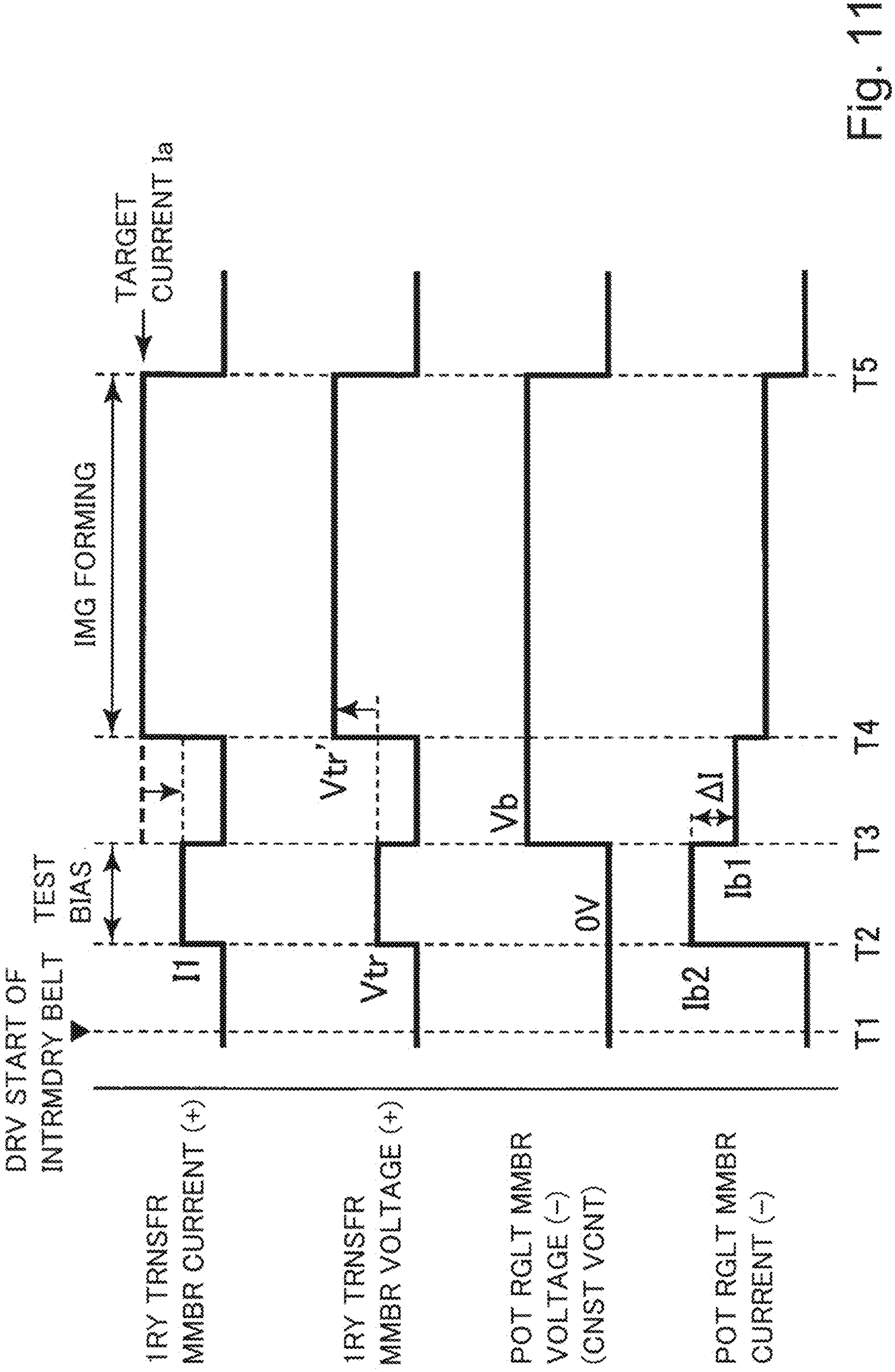

FIG. 11 is a timing chart diagram for illustrating the control of an Embodiment 2.

DESCRIPTION OF THE EMBODIMENTS

In the following, the image forming apparatus according to the present invention will be described in more detail with reference to the drawings.

Embodiment 1

1. General Structure and Operation of an Image Forming Apparatus

Figure 1:
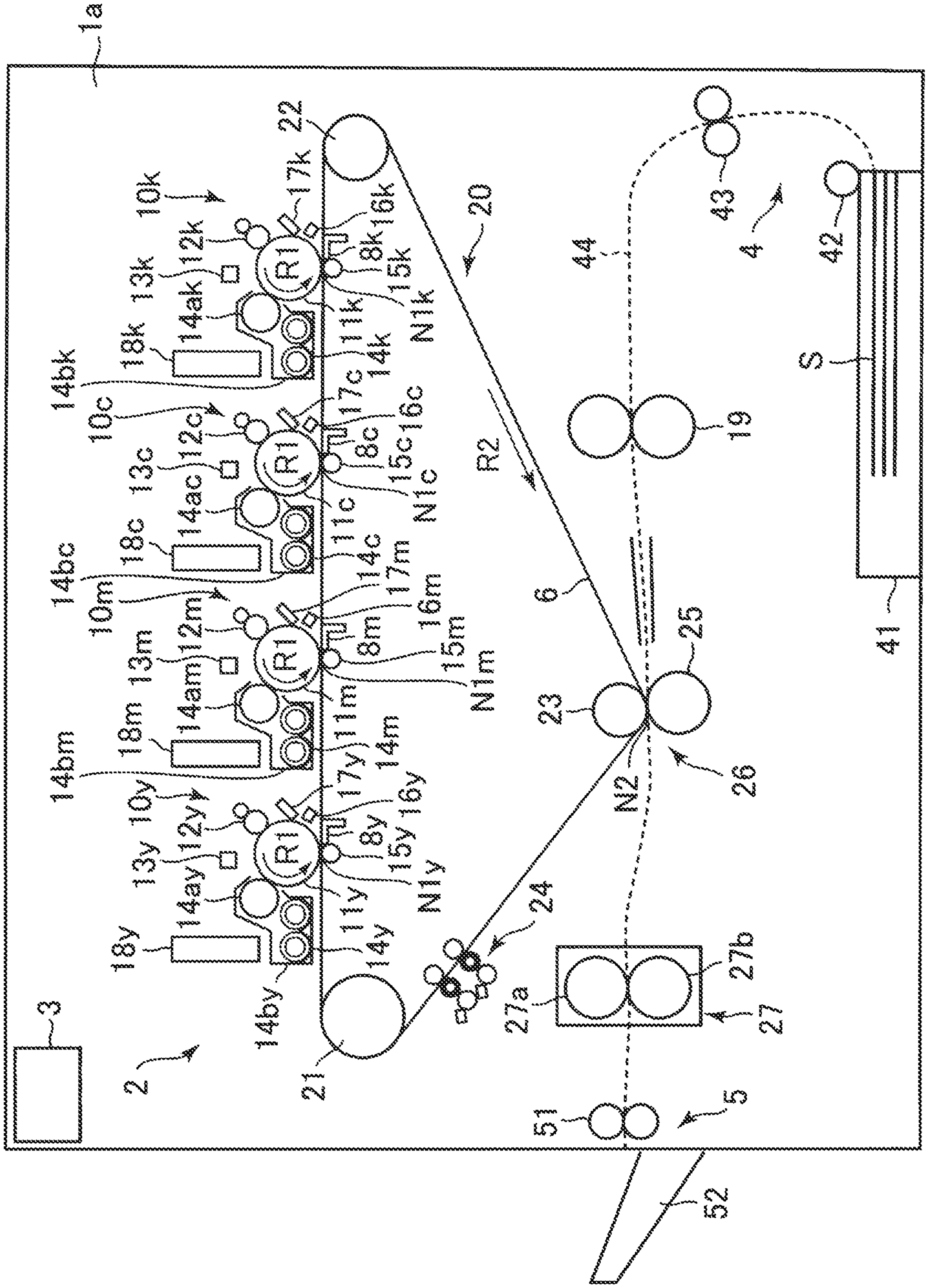
FIG. 1 is a schematic sectional view of an image forming apparatus.

First, a general structure and an operation of the image forming apparatus of this embodiment will be described. FIG. 1 is a schematic sectional view of an image forming apparatus 1 of this embodiment. The image forming apparatus 1 of this embodiment is a tandem type full-color printer capable of forming a full-color image on a sheet-like recording material S by using an electrophotographic type method and employing an intermediary transfer type system.

The image forming apparatus 1 includes an image forming portion 2, a controller 3, a feeding portion 4 of the recording material S, and a discharging portion 5 of the recording material S. Further, inside the image forming apparatus 1, a temperature sensor 71 (FIG. 2) capable of detecting a temperature inside the apparatus and a humidity sensor 72 (FIG. 2) capable of detecting a humidity inside the apparatus are provided. The image forming apparatus 1 is capable of forming an image on the recording material S on the basis of image information (image signal) acquired by an original reading apparatus (not shown) provided on the image forming apparatus 1 or connected to the image forming apparatus 1. Further, the image forming apparatus 1 is capable of forming an image on the recording material S on the basis of image information (image signal) from an external device (not shown), such as a personal computer (host device), a digital camera, or a smartphone, connected to the image forming apparatus 1. Incidentally, the recording material (transfer material, recording medium sheet) S is material on which a toner image is formed, and specific examples thereof include plain paper, thick paper, gloss coated paper, matte coated paper, embossed paper, or synthetic resin sheets (synthetic paper) which are substitutes for plain paper or the like, and overhead projector sheets (resin film). Here, the recording material S is referred to as "paper" ("paper", "embossed paper", "high-resistance paper", or the like in some instances, even though in those cases, the recording material S includes a material other than the paper or is a recording material formed with a material containing the material other than the paper.

The image forming portion 2 forms the image on the recording material S fed from the feeding portion 4 on the basis of the image information. The image forming portion 2 includes image forming units 10*y*, 10*m*, 10*c*, 10*k*, toner bottles 18*y*, 18*m*, 18*c*, 18*k*, exposure devices 13*y*, 13*m*, 13*c*, 13*k*, an intermediary transfer unit 20, a secondary transfer device 26, and a fixing device 27. The image forming units 10*y*, 10*m*, 10*c* and 10*k* form toner images of colors of yellow (Y), magenta (M), cyan (C), and black (K), respectively. Elements having the same or corresponding functions of structures provided for the respective colors will be collectively described by omitting suffixes y, m, c and k for representing elements for associated colors, respectively, in some instances. Further, the image forming apparatus 1 can also form, for example, a single-color image such as a (single) black image or a multi-color image by using the image forming unit(s) 10 for a desired single color or some of the four colors.

The image forming unit 10 includes a photosensitive drum 11 which is a drum-type (cylindrical) photosensitive member (electrophotographic photosensitive member) as an image bearing member. In addition, the image forming unit 10 includes a charging roller 12, which is a roller-type charging member, as charging means. In addition, the image forming unit 10 includes a developing device 14 as developing means. In addition, the image forming unit 10 includes a pre-exposure device 16 as a discharging (charge eliminating) means. In addition, the image forming portion 10 includes a drum cleaning device 17 as a photosensitive member cleaning means. The image forming unit 10 forms a toner image on an intermediary transfer belt 6 described hereinafter.

The photosensitive drum 11 is movable (rotatable) while carrying an electrostatic image (electrostatic latent image) or a toner image. In this embodiment, the photosensitive drum 11 is a negatively chargeable organic photosensitive member (OPC) having an outer diameter of 30 mm. The photosensitive drum 11 has an aluminum cylinder as a substrate and a surface layer formed on the surface of the substrate. In this embodiment, as the surface layer, three layers of an undercoat layer, a photocharge generation layer, and a charge transportation layer, which are applied and laminated on the substrate in the order named are provided. When an image forming operation is started, the photosensitive drum 11 is rotationally driven in a direction indicated by an arrow R1 (counterclockwise) in the figure at a predetermined peripheral speed (process speed) by a driving motor (not shown) as a driving means.

The surface of the rotating photosensitive drum 11 is uniformly electrically charged by the charging roller 12. In this embodiment, the charging roller 12 is a rubber roller which contacts the surface of the photosensitive drum 11 and which is rotated by the rotation of the photosensitive drum 11. To the charging roller 12, a charging power source 73 (FIG. 2) as a charging bias applying means (charging bias applying portion) is connected. The charging power source 73 applies a predetermined charging bias (charging voltage) to the charging roller 12 during the charging process.

The surface of the charged photosensitive drum 11 is scanned and exposed by the exposure device 13 in accordance with the image information, so that an electrostatic image is formed on the photosensitive drum 11. The exposure device 13 is a laser scanner in this embodiment. The exposure device 13 emits laser beam in accordance with separated color image information outputted from the controller 3, and scans and exposes the surface (outer peripheral surface) of the photosensitive drum 11.

The electrostatic image formed on the photosensitive drum 11 is developed (visualized) by supplying the toner thereto by the developing device 14, so that a toner image (developer image) is formed on the photosensitive drum 11. In this embodiment, the developing device 14 is a two-component developing device using, as a developer, a two-component developer comprising toner (non-magnetic toner particles) and a carrier (magnetic carrier particles). In a developing container (developing main body) 14*b* of the developing device 14, the two-component developer is accommodated, and toner in an amount corresponding to a consumed amount of the toner is supplied from the toner bottle 18. The developing device 14 includes a developing sleeve 14*a* as a developing member (developer carrying member). The developing sleeve 14*a* is made of, for example, a nonmagnetic material such as aluminum or nonmagnetic stainless steel (aluminum in this embodiment). Inside the developing sleeve 14*a*, a magnet roller (not shown) which is a roller shaped magnet as a magnetic field generating means (magnetic field generating member) is fixed and arranged so as not to rotate relative to the developing container 14*b*. The developing sleeve 14*a* carries the two-component developer and conveys it to a developing region opposing the photosensitive drum 11. Then, in the developing region, the toner is moved to and deposited on an image portion of the electrostatic image on the photosensitive drum 1 from the two-component developer on the developing sleeve 14*a*. A developing power source 74 (FIG. 2) as a developing bias applying means (developing bias applying portion) is connected to a developing sleeve 14*a*. The developing power source 74 applies a predetermined developing bias (developing voltage) to the developing sleeve 14*a* during the development. In this embodiment, on an exposed portion (image portion) of the photosensitive drum 11 lowered in absolute value of the potential by being exposed after being uniformly charged, the toner charged to the same polarity (negative polarity in this embodiment) as the charge polarity of the photosensitive drum 11 is deposited (reverse development type). In this embodiment, the normal charge polarity of the toner, which is a principal charge polarity of the toner during the development, is the negative polarity.

An intermediary transfer unit 20 is arranged so as to oppose the four photosensitive drums 11*y*, 11*m*, 11*c* and 11*k*. The intermediary transfer unit 20 includes the intermediary transfer belt 6, which is constituted by an endless belt as an intermediary transfer member. The intermediary transfer belt 6 is wound around, and stretched by, as a plurality of stretching rollers, a driving roller 21, a tension roller 22, and an inner secondary transfer roller 23. The intermediary transfer belt 6 is movable (rotatable) while carrying the toner image.

The driving roller 21 is rotationally driven by a driving motor (not shown) as driving means, so that driving force is transmitted to the intermediary transfer belt 6, and thus the intermediary transfer belt 6 is rotated (circulated and moved) in an arrow R2 direction (clockwise direction) in FIG. 1 at a predetermined peripheral speed corresponding to the peripheral speed of the photosensitive drum 1. The tension roller 22 controls tension of the intermediary transfer belt 6 to be constant. The tension roller 22 is subjected to force which urges the intermediary transfer belt 6 from an inner peripheral surface (back surface) side toward an outer peripheral surface (front surface) side by urging force of a tension spring (not shown) constituted by a compression coil spring which is an urging member as an urging means. By this force, tension of about 2 to 5 kg is applied in the feeding direction (process progression direction, movement direction) of the intermediary transfer belt 6. The inner secondary transfer roller 23 constitutes a secondary transfer device 26 in combination with an outer secondary transfer roller 25 described hereinafter. On the inner peripheral surface side of the intermediary transfer belt 6, primary transfer rollers 15*y*, 15*m*, 15*c*, 15*k*, which are roller-type primary transfer members as primary transfer means, are provided correspondingly to the photosensitive drums 11*y*, 11*m*, 11*c*, 11*k*, respectively. In this embodiment, the primary transfer rollers 15 are disposed opposed to the photosensitive drums 11 and nip the intermediary transfer belt 6 between themselves and the photosensitive drums 11. Each of the primary transfer roller 15 is pressed toward the photosensitive drum 11 and contacts the photosensitive drum 11 by way of the intermediary transfer belt 6, and forms a primary transfer portion (primary transfer nip) N1 which is a contact portion between the photosensitive drum 11 and the intermediary transfer belt 6.

The toner image formed on the photosensitive drum 11 is transferred (primarily transferred) onto the intermediary transfer belt 6 in the primary transfer portion N1 by action of the primary transfer roller 15. For example, when forming a full-color image, the yellow, magenta, cyan and black toner images formed on the photosensitive drums 11 are multiple-transferred so as to be sequentially superimposed on the intermediary transfer belt 6. A primary transfer power source 75 (FIG. 2) as a primary transfer bias applying means (primary transfer bias applying portion) is connected to the primary transfer roller 15. During the primary transfer, the primary transfer power source 75 applies a primary transfer bias (primary transfer voltage) which is direct current voltage having polarity opposite to the normal charge polarity of the toner (positive polarity in this embodiment) to the primary transfer roller 15. By this, the toner image of the negative polarity on the photosensitive drum 11 is primary transferred onto the intermediary transfer belt 6.

To the primary transfer voltage source 75, a voltage detecting sensor 75*a* (FIG. 2) as a voltage detecting means (voltage detecting portion), which detects output voltage thereof, and a current detecting sensor 75*b* (FIG. 2) as a current detecting means (current detecting portion), which detects an output current thereof, are connected. In this embodiment, for example, a primary transfer bias of about 1 to 2 kV is applied to the primary transfer roller 15 ("1 to 2 kV" shows a range including 1 kV and 2 kV, and the same applies hereinafter).

In addition, in this embodiment, the primary transfer bias is subjected to constant voltage control. In this embodiment, the primary transfer voltage sources 75*y*, 75*m*, 75*c* and 75*k* are provided independently for the primary transfer rollers 15*y*, 15*m*, 15*c* and 15*k*, respectively. Further, in this embodiment, the primary transfer bias applied to the primary transfer rollers 15*y*, 15*m*, 15*c* and 15*k* can be individually controlled.

Here, in this embodiment, the primary transfer roller 15 has a core metal and an elastic layer of ion conductive foam rubber (NBR rubber) formed at a periphery of the core metal. An outer diameter of the primary transfer roller 15 is, for example, 15 to 20 mm. In addition, as the primary transfer roller 15, a roller having an electric resistance value of $1\times10^5$ to $1\times10^8\Omega$ (N/N (23° C., 50% RH) condition, 2 kV applied) can be preferably used.

Further, in this embodiment, the intermediary transfer belt 6 is an endless belt having a two-layer structure including a base layer, and a surface layer in the order named from the inner peripheral surface side toward the outer peripheral surface side. As the material constituting the base layer, a resin such as polyimide or polycarbonate, in which an appropriate amount of carbon black is contained as an antistatic agent can be suitably used. The thickness of the base layer is, for example, 0.05 to 0.15 mm. As a material constituting the surface layer, a resin such as chloroprene rubber (CR) to which electroconductivity is imparted can be suitably used. The thickness of the surface layer is, for example, 0.200 to 0.300 mm. In this embodiment, the intermediary transfer belt 6 has a volume resistivity of $5\times10^8$ to $1\times10^{14}$ $\Omega\cdot$cm (23° C., 50% RH). Incidentally, in this embodiment, the two-layer structure was employed in the intermediary transfer belt 6, but a single-layer structure of a material corresponding to the material of the above-described base layer may also be employed. Further, the surface layer may also be formed as a resin coated layer, of about 0.002 to 0.01 mm in thickness, containing a resin material such as a fluorine containing resin. Further, the intermediary transfer belt 6 may have a multi-layer structure of three or more layers.

On the outer peripheral surface side of the intermediary transfer belt 6, the outer secondary transfer roller 25, which is a roller-type secondary transfer member, as a secondary transfer means is disposed. The outer secondary transfer roller 25 as the secondary transfer member constitutes the secondary transfer device 26 in cooperation with the inner secondary transfer roller 23 as an opposing member (opposing electrode). The outer secondary transfer roller 25 is pressed toward the inner secondary transfer roller 23, and contacts the inner secondary transfer roller 23 by way of the intermediary transfer belt 6 and forms a secondary transfer portion (secondary transfer nip) N2 which is a contact portion between the intermediary transfer belt 6 and the outer secondary transfer roller 25. The toner image formed on the intermediary transfer belt 6 is transferred (secondarily transferred) onto the recording material S, nipped and fed by the intermediary transfer belt 6 and the outer secondary transfer roller 25, by the action of the secondary transfer device 26 in the secondary transfer portion N2. To the outer secondary transfer roller 25, a secondary transfer power source 76 as a secondary transfer bias applying means (secondary transfer bias applying portion) (FIG. 2) is connected. During the secondary transfer, the secondary transfer power source 76 applies a secondary transfer bias (secondary transfer voltage) which is direct current voltage having polarity opposite to the normal charge polarity of the toner (positive polarity in this embodiment), to the outer secondary transfer roller 25. By this, the toner image of the negative polarity on the intermediary transfer belt 6 is secondarily transferred onto the recording material S. To the secondary transfer power source 76, a voltage detecting sensor **76*a* (FIG. 2) as the voltage detecting means (voltage detecting portion), which detects output voltage thereof, and a current detecting sensor 76*b* (FIG. 2) as the current detecting means (current detecting portion), which detects output current thereof, are connected. Further, the core metal of the inner secondary transfer roller 23 is connected to the ground potential. In this embodiment, for example, a secondary transfer bias of about 1 to 6.5 kV is applied to the secondary transfer roller 25, and current of about 15 to 100 μA is caused to flow through the secondary transfer portion N2, so that the toner image on the intermediary transfer belt 6 is secondarily transferred onto the recording material S. In this embodiment, the secondary transfer bias is subjected to the constant voltage control. Incidentally, a constitution in which, to the inner secondary transfer roller 23 as the secondary transfer member, the secondary transfer bias, which is the DC voltage of the same polarity as the normal charge polarity of the toner, is applied from the secondary transfer power source 76, so that the outer secondary transfer roller 25** as the opposing member is connected to the ground potential, may also be employed.

The recording material S is fed from the feeding portion 4 toward the secondary transfer portion N2 in parallel to the forming operation of the toner image onto the intermediary transfer belt 6. The recording material S is accommodated in a cassette 41 as a recording material accommodating portion of the feeding portion 4. The recording material S accommodated in the cassette 41 is separated and fed one by one from the cassette 41 by a feeding roller 42 or the like. This recording material S is conveyed by a conveying roller 43 or the like as a conveying member of the feeding portion 4 to a registration roller pair 19 as a conveying member provided on a conveying passage 44 of the recording material S. Then, this recording material S is conveyed by the registration roller pair 19 to the secondary transfer portion N2 by being timed to the toner image on the intermediary transfer belt 6. Incidentally, in FIG. 1, only one cassette 41 is illustrated, but the image forming apparatus 1 may also include a plurality of cassettes 41. Further, the feeding portion 4 may be capable of feeding the recording material S also from a recording material accommodating portion (recording material mounting portion) other than the cassette 41 such as a manual feeding tray or the like.

Here, in this embodiment, the outer secondary transfer roller 25 includes a core metal and an elastic layer of ion conductive foam rubber (NBR rubber) formed around the core metal. The outer diameter of the outer secondary transfer roller 25 is, for example, 20 to 25 mm. In addition, as the outer secondary transfer roller 25, a roller having an electric resistance value of $1\times10^5$ to $1\times10^8\Omega$ (measured at N/N (23° C., 50% RH), 2 kV applied) can be preferably used.

Figure 2:
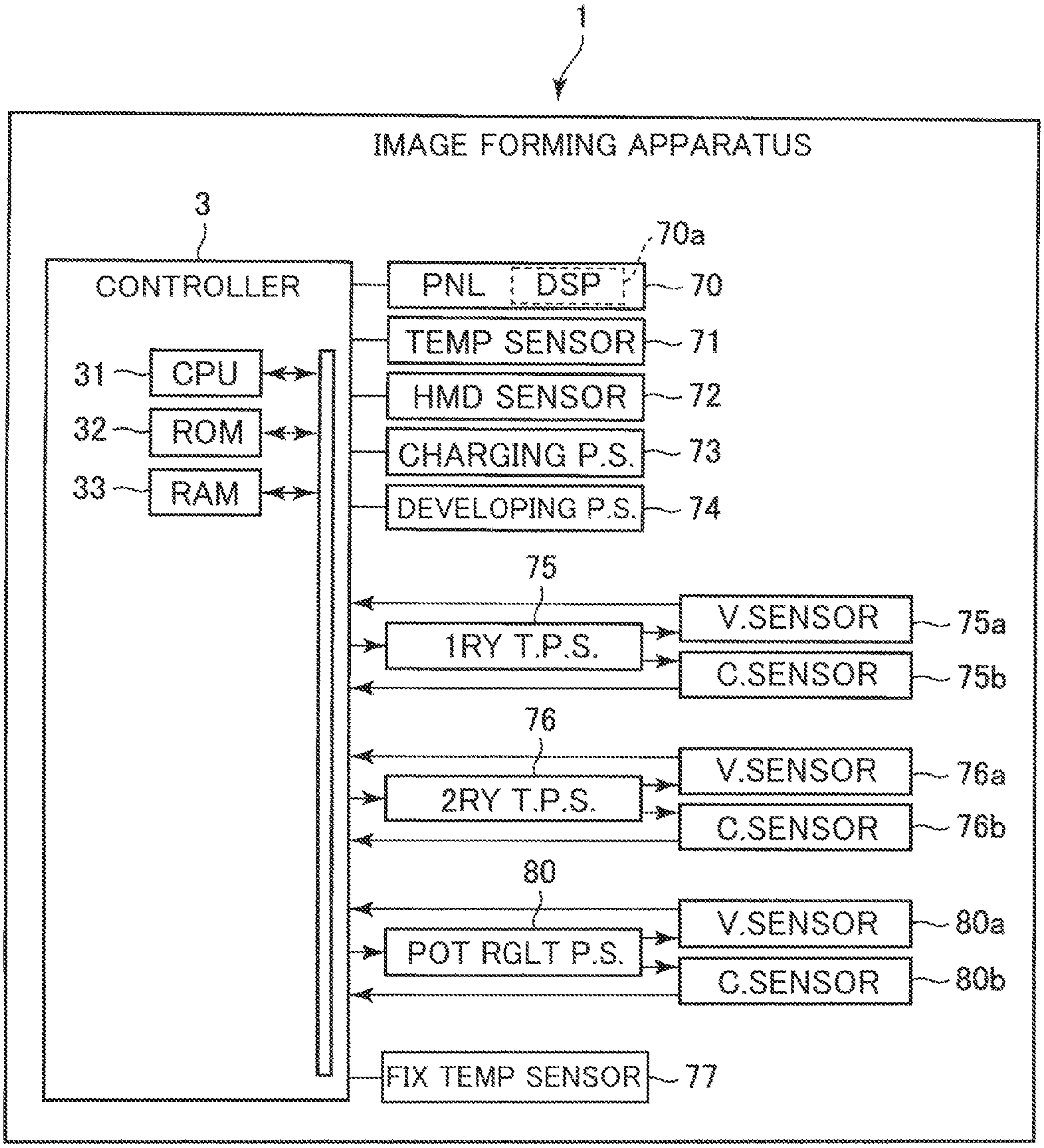
FIG. 2 is a block diagram showing a control system of the image forming apparatus.

The recording material S onto which the toner image has been transferred is fed to a fixing device 27 as a fixing means. The fixing device 27 includes a fixing roller **27*a* and a pressing roller 27*b*. The fixing roller 27*a* includes therein a heater as a heating means. The pressing roller 27*b* is press-contacted to the fixing roller 27*a* and forms a fixing portion (fixing nip). The fixing device 27 causes the recording material S carrying the unfixed toner image to be heated and pressed by nipping and feeding the recording material S between the fixing roller 27*a* and the pressing roller 27*b*, and thus causes the toner image to be fixed (melted, stuck) on the recording material S. Incidentally, the temperature of the fixing roller 27*a* (fixing temperature) is detected by a fixing temperature sensor 77 (FIG. 2). The recording material S on which the toner image is fixed is fed by a discharging roller pair 51 or the like, and is discharged (outputted) through a discharge opening (not shown), onto a discharge tray 52 provided outside an apparatus main assembly 1*a* of the image forming apparatus 1**.

The surface of the photosensitive drum 11 after the primary transfer is electrically discharged by the pre-exposure device 16. In addition, the toner remaining on the photosensitive drum 11 without being transferred onto the intermediary transfer belt 6 during the primary transfer (primary transfer residual toner) is removed from the surface of the photosensitive drum 11 by the drum cleaning device 17 and is collected. In this embodiment, the drum cleaning device 17 scrapes off the primary transfer residual toner from the surface of the rotating photosensitive drum 11 by a cleaning blade as a cleaning member, and collects the primary transfer residual toner in a collecting container (not shown). The cleaning blade is a plate-like member contacting the photosensitive drum 11 with a predetermined pressing force. The cleaning blade contacts the surface of the photosensitive drum 11 in a counter direction of the rotational direction of the photosensitive drum 11 so that a leading end thereof on a free end portion side faces the upstream side of the rotational direction of the photosensitive drum 11. Further, a deposited matter such as toner remaining on the intermediary transfer belt 6 without being transferred onto the recording material S during the secondary transfer (secondary transfer residual toner) or the like is removed and collected from the surface of the intermediary transfer belt 6 by a belt cleaning device 24 as an intermediary transfer member cleaning means.

Incidentally, the image forming unit 10 may constitute a cartridge (process cartridge) integrally detachably mountable to the apparatus main assembly 1*a* of the image forming apparatus 1. In this embodiment, the intermediary transfer unit 20 is constituted by the intermediary transfer belt 6, the stretching rollers for the intermediary transfer belt 6, the respective primary transfer rollers 15, the belt cleaning device 24, and potential regulating members 8 and the like described hereinafter. The intermediary transfer unit 20 may be integrally detachably mountable to the apparatus main assembly 1*a*.

2. Control Constitution

FIG. 2 is a block diagram showing a schematic constitution of a control system of the image forming apparatus 1 of this embodiment. The image forming apparatus 1 is provided with the controller 3 (control circuit) as a control means. The controller 3 is constituted by including a CPU 31 as a calculating means, a ROM 32 as a storing means, a RAM 33 as a storing means, and an input/output circuit (I/F) (not shown) for inputting/outputting signals between itself and the external device, etc. The ROM 32 stores programs or the like for controlling the respective portions of the image forming apparatus 1. The RAM 33 temporarily stores data on the control, etc. The CPU 31 is a microprocessor which controls the entire image forming apparatus 1 and is a main part of the system controller. The CPU 31 is connected to the respective portions such as the feeding portion 4, the image forming portion 2, the discharge portion 5, and the like, and not only exchanges signals with these portions, but also controls the operation of each of these portions. The ROM 32 stores an image formation control sequence for forming the image on the recording material S, etc.

To the controller 3, the charging power source 73, the developing power source 74, the primary transfer power source 75, the secondary transfer power source 76, a potential regulating power source 80 described hereinafter, etc., which are controlled by signals from the controller 3, respectively, are connected. Incidentally, although omitted from illustration, in this embodiment, each of the charging power source 73, the developing power source 74, the primary transfer power source 75, and the potential regulating power source 80 is provided independently from the associated image forming unit 10. In addition, to the controller 3, the temperature sensor 71, the humidity sensor 72, the voltage detecting sensor 75*a* and the current detecting sensor 75*b* of the primary transfer voltage source 75, the voltage detecting sensor 76*a* and the current detecting sensor 76*b* of the secondary transfer voltage source 76, a voltage detecting sensor 80*a* and a current detecting sensor 80*b* of a potential regulating power source 80 which will be described below, and the fixing temperature sensor 77, and the like are connected. A signal (information) indicating a detecting result of each of the sensors is input to the controller 3.

Further, to the controller 3, an operating portion 70 is connected. The operating portion 70 includes an inputting portion constituted by an operation button (key) or the like as an input means, and a display portion 70*a* constituted by a liquid crystal panel (display) or the like as display means. Incidentally, in this embodiment, the display portion 70*a* is constituted as a touch panel, and also has a function as the input means. An operator such as a user or a service person operates the operating portion 70 and thus can cause the image forming apparatus 1 to execute a job (described later). The controller 3 receives the signal from the operating portion 70 and operates various devices of the image forming apparatus 1. In addition, the image forming apparatus 1 can also execute the job depending on the signal, for example, from the external device such as the personal computer, not from the operating portion 70.

Here, the image forming apparatus 1 executes the job (print job), which is a series of operations to form and output images on the single or multiple recording materials S, started by a single start instruction. The job generally includes an image forming process, a pre-rotation process, a sheet interval process in a case in which images are formed on the multiple recording materials S, and a post-rotation process. The image forming process is a period during which formation of the electrostatic image of the image to be actually formed and output on the recording material S, formation of the toner image, and the primary transfer and the secondary transfer of the toner image are performed, and during image formation (image forming period) refers to this period. More specifically, timing of the image formation differs at positions in which these processes of the formation of the electrostatic image, the formation of the toner image, and the primary transfer and secondary transfer of the toner image are performed. The pre-rotation process is a period of preparatory operations prior to the image forming process, from the time when the start instruction is input to the time when the image forming process actually begins. The sheet interval process (recording material interval process, image interval process) is a period corresponding to an interval between the recording material S and the recording S when the image formations for the multiple recording materials S are performed continuously (continuous printing, continuous image formation). The post-rotation process is a period during which organizing operations (preparatory operations) are performed after the image forming process. A non-image forming time (non-image forming period) is a period other than during the image formation, and includes the previous rotation process, the sheet interval process, the post-rotation process, which are described above, and also a pre-multi-rotation process, which is a preparatory operation when the image forming apparatus 1 is turned on or returns from a sleep state.

3. Problem in a Secondary Transferability

Next, a problem in a secondary transferability will be further described. Incidentally, for convenience, unless otherwise mentioned, magnitude (high/low) of voltage and potential refers to magnitude (high/low) in a case in which values thereof are compared with each other in terms of an absolute value. Further, as regards arrangements of the primary transfer portion N1, the photosensitive drum 11, the primary transfer roller 15 and the potential regulating member 8 described hereinafter, and the like, unless otherwise mentioned, upstream and downstream refer to upstream and downstream with respect to the feeding direction (process progression direction, movement direction) of the intermediary transfer belt 6.

As described above, the toner on the intermediary transfer belt 6 is subjected to electric discharge between the intermediary transfer belt 6 and the photosensitive drum 11 downstream of the primary transfer portion N1 and thus a charge amount tends to increase. As the present inventors conducted the diligent study, it was found that as the amount of charge of the toner on the intermediary transfer belt 6 increases, mirror force between the toner and the intermediary transfer belt 6 increases and thus it becomes difficult to transfer the toner to the recording material S in the secondary transfer portion N2. For example, when the charge amount of the toner on the intermediary transfer belt 6 increases, the secondary transfer electric field required to transfer the toner to the recording material in the secondary transfer portion N2 becomes larger, which may worsen graininess of the image. In addition, it is also difficult to transfer the toner uniformly, for example, to the embossed paper with an uneven surface, etc., because a gap is created between the intermediary transfer belt 6 and the paper in the secondary transfer portion N2 and the relatively large secondary transfer electric field is required. Therefore, as the charge amount of the toner on the intermediary transfer belt 6 increases, it becomes even more difficult to transfer the toner to the embossed paper with an uneven surface, etc. Incidentally, the embossed paper is a paper with a pattern of unevenness on a surface of the paper using methods such as embossing and stamping (fancy paper). Further, for the recording materials with relatively high electrical resistance (high-resistance paper), such as a synthetic paper and a resin film, which are made mainly of synthetic resin, similar to the embossed paper described above, the transfer of the toner becomes even more difficult when the charge amount of the toner on the intermediary transfer belt 6 increases.

In order to suppress the increase of the charge amount of the toner downstream of the primary transfer portion N1 as described above, it is effective to suppress the electric discharge downstream of the primary transfer portion N1. For this purpose, it is effective to reduce potential difference between the photosensitive drum 11 and the intermediary transfer belt 6 after the primary transfer. As the present inventors conduct diligent study, it is found that in order to suppress the electric discharge downstream of the primary transfer portion N1, it is effective to place the potential regulating member, which is a conductive electrode member, downstream of the primary transfer portion N1 and on the inner peripheral surface of the intermediary transfer belt 6, and to apply the bias of the same polarity as the charging polarity of the photosensitive drum 11 to the potential regulating member.

4. Potential Regulating Member

Next, a constitution of the potential regulating member 8 in this embodiment will be described. As shown in FIG. 1, the image forming apparatus 1 of this embodiment, on sides downstream of the primary transfer portions N1*y*, N1*m*, N1*c*, and N1*k*, the potential regulating members **8*y*, 8*m*, 8*c*, and 8*k* which are electrode members are provided, respectively, in contact with the inner peripheral surface of the intermediary transfer belt 6. In this embodiment, the potential regulating members 8*y*, 8*m*, 8*c* and 8*k*** provided in the primary transfer portions N1*y*, N1*m*, N1*c* and N1*k* have substantially the same constitution.

A shape of the potential regulating member 8 in this embodiment will be described. Part (a) of FIG. 3 is a sectional view (cross section substantially perpendicular to a rotational axis direction of the photosensitive drum 11) of the potential regulating member 8 in this embodiment. Further, part (b) of FIG. 3 is a perspective view of the potential regulating member 8 in this embodiment.

In this embodiment, the potential regulating member 8 includes a planar first portion 81 provided along a widthwise direction (direction substantially perpendicular to the feeding direction, direction substantially parallel to the rotational axis direction of the photosensitive drum 11) of the intermediary transfer belt 6. Further, in this embodiment, the potential regulating member 8 includes a planar second portion 82 provided along the widthwise direction of the intermediary transfer belt 6 and extending in a direction substantially perpendicular to a flat surface of the first portion 81. In this embodiment, a contact surface 83 of the first portion 81 of the potential regulating member 8, which is a contact portion contacting the inner peripheral surface of the intermediary transfer belt 6 is a flat surface. That is, in this embodiment, the first portion 81 constituting the contact surface 83 of the potential regulating member 8 is a flat plate.

Here, in a cross section substantially perpendicular to the rotational axis direction of the photosensitive drum 11, an upstream-side end portion of the contact surface 83 is defined as "A (or upstream end A)", and a downstream-side end portion of the contact surface 83 is defined as "B (or downstream end B)". In this embodiment, the upstream end A of the contact surface 83 corresponds to an upstream-side end portion of the potential regulating member 8, and the downstream end B of the contact surface 83 corresponds to a downstream-side end portion of the potential regulating member 8. In order to more effectively suppress the electric discharge between the intermediary transfer belt 6 and the photosensitive drum 11, the potential regulating member 8 may preferably be surface-contacted to the intermediary transfer belt 6. From this viewpoint, a length of a line segment AB (between A and B), i.e., a "contact width" which is a length of the contact surface 83 in the feeding direction of the intermediary transfer belt 6 may preferably be 5 mm or more. With a longer length of the line segment AB, the above-described effect of suppressing the electric discharge becomes larger, but it would be considered that when the length becomes excessively long, stable contact of the potential regulating member 8 with the intermediary transfer belt 6 becomes difficult by the influence of (component) part accuracy or the like. The length of the line segment AB is sufficient in many cases when the length is 50 mm or less, and typically is 30 mm or less. That is, the length of the line segment AB may suitably be about 5 to 50 mm, typically about 5 to 30 mm. From another viewpoint, it can be said that the length of the line segment AB is enough to be equal to or less than a half of a center distance between adjacent photosensitive drums 11 in a cross section substantially perpendicular to the rotational axis direction of the photosensitive drum 11 in many cases. In this embodiment, the potential regulating member 8 which is 25 mm in length of the line segment AB is used. Incidentally, in this embodiment, the center distance between the photosensitive drums 11 in the cross section substantially perpendicular to the rotational axis direction of the photosensitive drum 11 is about 100 mm.

To the potential regulating member 8, the potential regulating power source 80 as a potential regulating bias applying means (potential regulating bias applying portion) is connected. To the potential regulating power source 80, a voltage detecting sensor 80*a* (FIG. 2) as the voltage detecting means (voltage detecting portion), which detects output voltage thereof, and a current detecting sensor 80*b* (FIG. 2) as the current detecting means (current detecting portion), which detects output current thereof, are connected. In this embodiment, to the second portion 82 of the potential regulating member 8, the potential regulating power source 80 is connected. At least at the time of the primary transfer during the image forming operation, to the potential regulating member 8, potential regulating bias (potential regulating voltage) which is DC voltage of the same polarity as the charge polarity of the photosensitive drum 11 is applied by the potential regulating power source 80. The time of the primary transfer is specifically a period in which the primary transfer bias is applied, more specifically, a period in which an image region (region onto which the toner image is capable of being transferred) on the intermediary transfer belt 6 passes through the primary transfer portion N1. By this, it becomes possible to reduce the potential difference between the intermediary transfer belt 6 and the photosensitive drum 11 and suppress the electric discharge between the intermediary transfer belt 6 and the photosensitive drum 11 downstream of the primary transfer portion N1. In this embodiment, the potential regulating bias is DC voltage of negative polarity. In this embodiment, the potential regulating bias is controlled under the constant voltage control. Further, in the constitution of this embodiment, the potential regulating bias (constant voltage of positive polarity) may preferable be about −500 to −3000 V. Incidentally, in this embodiment, the constant voltage is applied to the potential regulating member 8 by the potential regulating power source 80, however, a certain level of effect can be expected even if the potential regulating member 8 is grounded.

The potential regulating member 8 is a member long in the widthwise direction of the intermediary transfer belt 6. A length of the contact surface 83 of the potential regulating member 8 in a longitudinal direction (direction along the widthwise direction of the intermediary transfer belt 6) may preferably be longer than a maximum image width in the widthwise direction of the intermediary transfer belt 6. Incidentally, the maximum image width is a length of the image region of a maximum image capable of being formed by the image forming apparatus 1 with respect to the widthwise direction of the intermediary transfer belt 6. In this embodiment, the length of the contact surface 83 of the potential regulating member 8 in the longitudinal direction is longer than the above-described maximum image width and a width in which the primary transfer roller 15 contacts the intermediary transfer belt 6 with respect to the widthwise direction of the intermediary transfer belt 6. That is, in this embodiment, each of a range of the maximum image width and a range in which the primary transfer roller 15 contacts the intermediary transfer belt 6 with respect to the widthwise direction of the intermediary transfer belt 6 falls inside a range of the length of the contact surface 83 of the potential regulating member 8 in the longitudinal direction.

By this, irrespective of a length of the toner image, transferred onto the intermediary transfer belt 6, with respect to the widthwise direction of the intermediary transfer belt 6, it is possible to obtain an effect of suppressing an increase in charge amount of the toner on the intermediary transfer belt 6 by suppressing the above-described electric charge. On the other hand, in this embodiment, the length of the potential regulating member 8 in the longitudinal direction is shorter than the width of the intermediary transfer belt 6. That is, in this embodiment, the range of the length of the potential regulating member 8 in the longitudinal direction falls inside the range of the width of the intermediary transfer belt 6. By this, in the case where an end portion of the potential regulating member 8 with respect to the longitudinal direction protrudes further than an end portion of the intermediary transfer belt 6 does with respect to the widthwise direction, electric discharge to the potential regulating member 8 and a member around the intermediary transfer belt 8, and the like occurs, so that a possibility that the effect of suppressing the electrical discharge becomes small can be reduced.

The potential regulating member 8 can be constituted only by, for example, a single material having electroconductivity. In this embodiment, the potential regulating member 8 is constituted substantially only of metal having electroconductivity, such as SUS (stainless steel). Specifically, in this embodiment, the potential regulating member 8 is constituted by forming the first portion 81 and the second portion 82 by subjecting a plate material made of metal (metal plate) such as SUS to bending. In this embodiment, each of the first portion 81 and the second portion 82 of the potential regulating member 8 is not substantially deformed in a use state of the image forming apparatus 1. By subjecting the metal plate to the bending in this manner, strength of the potential regulating member 8 can be increased. However, the present invention is not limited to such an embodiment, but the potential regulating member 8 may also be constituted by two or more materials.

FIG. 4 is a sectional view (cross section substantially perpendicular to the rotational axis direction of the photosensitive drum 11) in another example of the potential regulating member 8. For example, as shown in FIG. 4, a constitution in which a base portion 84 having a shape similar to the shape of the potential regulating member 8 shown in FIG. 3 and a surface layer 85 formed on the base portion 84 are provided can be employed. The contact surface 83 contacting the intermediary transfer belt 6 and the surface layer 85 constituting a connecting portion with the potential regulating power source 80 are formed of an electroconductive material such as metal or an electroconductive resin material. The base portion 84 may be formed of the electroconductive material, but may also be formed of a non-electroconductive material such as a non-electroconductive resin material. The base portion 84 and the surface layer 85 can be fixed by an arbitrary fixing means such as an adhesive or welding.

Further, FIG. 5 is a sectional view (cross section substantially perpendicular to the rotational axis direction of the photosensitive drum 11) in still another example of the potential regulating member 8. For example, as shown in FIG. 5, the contact surface 83 of the potential regulating member 8 contacting the intermediary transfer belt 6 may also be formed of an electroconductive nonwoven fabric 86. Incidentally, in FIG. 5, the electroconductive nonwoven fabric 86 is provided on the contact surface 83 of the potential regulating member 8 having the constitution shown in FIG. 4, but the electroconductive nonwoven fabric 86 may also be provided on the contact surface 83 of the potential regulating member 8 having the constitution shown in FIG. 3. The electroconductive nonwoven fabric 86 can be fixed by an arbitrary fixing means such as an electroconductive adhesive. Further, instead of the nonwoven fabric 86, a felt, a pile fabric (out pile fabric (velvet, brush) or loop pile fabric (towelling)) which are constituted using electroconductive fibers, or a sponge (elastic foam member) constituted using an electroconductive rubber material may also be used. Thus, the contact surface 83 of the potential regulating member 8 contacting the intermediary transfer belt 6 is constituted by a flexible material or an elastic material, so that it is possible to reduce a possibility of an occurrence of scars on an inner peripheral surface of the intermediary transfer belt 6 caused by friction (slide) between the inner peripheral surface of the intermediary transfer belt 6 and the potential regulating member 8.

Next, an arrangement of the potential regulating member 8 in this embodiment will be described. FIG. 6 is a sectional view (cross section substantially perpendicular to the rotational axis direction of the photosensitive drum 11) for illustrating the arrangement of the potential regulating member 8 provided between two primary transfer portions N1 adjacent to each other in the feeding direction of the intermediary transfer belt 6. In FIG. 6, as an example, a potential regulating member 8*c* provided between the primary transfer portions N1*c* for cyan and N1*k* for black is shown.

In this embodiment, an outer diameter of the photosensitive drum 11 is 30 mm, an outer diameter of the primary transfer roller 15 is 18 mm, and a thickness of the intermediary transfer belt 6 is 0.350 mm. Further, in this embodiment, the primary transfer roller 15 is offset toward a downstream side relative to the photosensitive drum 11. In this embodiment, an offset amount X1 is 3 mm. Incidentally, the offset amount X1 is a distance between a rotation center of the photosensitive drum 11 and a rotation center of an associated primary transfer roller 15 in a direction along a common tangential line on a side where a plurality of photosensitive drums 15 contact the intermediary transfer belt 6 in a cross section substantially perpendicular to the rotational axis direction of the photosensitive drum 11.

Here, in order to illustrate the arrangement of the potential regulating member 8, the case where the potential regulating member 8 is removed is assumed. In the cross section substantially perpendicular to the rotational axis direction of the photosensitive drum 11, a rectilinear line along which a stretching surface of the intermediary transfer belt on an inner peripheral surface side in a portion downstream of the primary transfer portion N1 passes in the case where there is no potential regulating member 8 is defined as a rectilinear line L. Incidentally, specifically, this rectilinear line L corresponds to the stretching surface in a state in which only the potential regulating member 8 is substantially removed from the constitution of the image forming apparatus 1 in a state during the image forming operation (however, the photosensitive drum 11 and the intermediary transfer belt 6 are at rest). Further, on the rectilinear line L, a portion where the inner peripheral surface of the intermediary transfer belt 6 is separated from a closest stretching member on an upstream side of the potential regulating member 8 is defined as "C (or upstream stretching portion C)", and a portion where the inner peripheral surface of the intermediary transfer belt 6 is separated from a closest stretching member on a downstream side of the potential regulating member 8 is defined as "D (or downstream stretching portion D)". Incidentally, in FIG. 6, the rectilinear line Lis schematically shown substantially horizontally, but in the case where the surface of the primary transfer roller 15 is raised toward the photosensitive drum 11 side by deformation or the like of the elastic layer of the primary transfer roller 15, the rectilinear line L may be inclined downward toward the downstream side in the figure.

In this embodiment, the closest stretching member on the upstream side of the potential regulating member 8 is the primary transfer roller 15, and a position on the inner peripheral surface of the intermediary transfer belt 6 at a portion where the intermediary transfer belt 6 is separated from the primary transfer roller 15 is the upstream stretching portion C. However, the closest stretching member on the upstream side of the potential regulating member 8 is not limited to the primary transfer member 15. For example, in the case where the primary transfer roller 15 is offset and disposed on an upstream side relative to the photosensitive drum 11, a position on the inner peripheral surface of the intermediary transfer belt 6 at a portion corresponding to a portion where the intermediary transfer belt 6 is separated from the photosensitive drum 11 is the upstream stretching portion C.

Further, in this embodiment, the closest stretching member on the downstream side of the potential regulating member 8 is the corresponding one of the photosensitive drums 11*m*, 11*c*, and 11*k* disposed adjacent to the potential regulating member 8 on the downstream side of the potential regulating member 8 for the primary transfer portions N1*y*, N1*m*, and N1*c*, respectively, for yellow, magenta, and cyan. Further, a position on the inner peripheral surface of the intermediary transfer belt 6 at a portion corresponding to a portion where the intermediary transfer belt 6 is separated from an associated one of the photosensitive drums 11*m*, 11*c*, and 11*k* is the downstream stretching portion D. However, the closest stretching member on the downstream side of the potential regulating member 8 is not limited to the photosensitive drum 11. For example, in the case where the primary transfer roller 15 is offset and disposed on the upstream side relative to the photosensitive drum 11, a position on the inner peripheral surface of the intermediary transfer belt 6 at a portion where the intermediary transfer belt 6 is separated from the primary transfer roller 15 is the downstream stretching portion D. Further, in this embodiment, for the most downstream primary transfer portion N1*k* for black, the closest stretching member on the downstream side thereof is the stretching roller (tension roller in this embodiment) 22. Further, a position on the inner peripheral surface of the intermediary transfer belt 6 at a portion where the intermediary transfer belt 6 is separated from the stretching roller 22 is the downstream stretching portion D.

Further, for each of the primary transfer portions N1, as the closest stretching member on the downstream side of the potential regulating member 8, in the case where there is another stretching roller for regulating an attitude of the intermediary transfer belt 6 during the image forming operation, the rectilinear line L and the downstream stretching portion D are defined on the basis of its stretching roller. Further, in the case where not the stretching roller, a scraper or a brush is contacted to the inner peripheral surface of the intermediary transfer belt 6 for the purpose of cleaning the inner peripheral surface of the intermediary transfer belt 6 or for the like purpose, the scraper or the brush can be regarded as the closest stretching member on the downstream side of the potential regulating member 8 when the scraper or the brush regulates the attitude of the intermediary transfer belt 6. The scraper is constituted by a sheet-like or film-like member in general.

As shown in FIG. 6, the potential regulating member 8 is disposed downstream of and close to the primary transfer portion N1 so as not to contact the primary transfer roller 15 and the photosensitive drum 11 via the intermediary transfer belt 6. At this time, as the upstream end A is closer to the primary transfer portion N1, the above-described electric charge suppressing effect becomes larger. In this embodiment (FIG. 6), the potential regulating member 8 is disposed in a position downstream of the primary transfer portion N1 so that a distance X2 from the primary transfer roller 15 to the upstream end A becomes about 8 mm. Here, the distance X2 is a distance between the rotation center of the primary transfer roller 15 and the upstream end A in a direction along the common tangential line on a side where the plurality of photosensitive drums 11 contact the intermediary transfer belt 6 in the cross section substantially perpendicular to the rotational axis direction of the photosensitive drum 11. That is, in this embodiment, the distance from the rotation center of the primary transfer roller 15 to the upstream end A is shorter than a distance (radius) from the rotation center of the primary transfer roller 15 to an outer peripheral surface of the primary transfer roller 15. The distance X2 is not limited thereto, but may preferably be about 1 to 20 mm, typically about 1 to 10 mm.

Further, in this embodiment, the potential regulating member 8 is pressed against the inner peripheral surface of the intermediary transfer belt 6 by a pressing spring 87 (part (b) of FIG. 3) constituted by a compression coil spring which is an urging member as an urging means at each of opposing end portions thereof with respect to the longitudinal direction thereof. At this time, the contact portion of the potential regulating member 8 contacting the inner peripheral surface of the intermediary transfer belt 6 is caused to enter the photosensitive drum 11 side relative to the rectilinear line L. By this, even in the case where waving or vibration occurs on the intermediary transfer belt 6 during the image forming operation (during traveling of the intermediary transfer belt 6), the potential regulating member 8 can be more stably contacted to the intermediary transfer belt 6. In this embodiment, pressing force of the pressure spring 87 is set (adjusted) so that the upstream end A and the downstream end B of the contact surface 83, which is the contact portion of the potential regulating member 8 contacting the inner peripheral surface of the intermediary transfer belt 6, enter toward the photosensitive drum 11 side by about 0.5 mm relative to the rectilinear line L. By having the contact surface 83 of the potential regulating member 8 enter into the photosensitive drum 11 side relative to the rectilinear line L in this manner, the potential regulating member 8 can be surface-contacted to the intermediary transfer belt 6 more stably even in the case where the waving or the vibration occurs on the intermediary transfer belt 6 during the image forming operation (during running of the intermediary transfer belt 6). Although the potential regulating member 8 is not limited thereto, an entering amount of the contact surface 83 of the potential regulating member 8 into the rectilinear line L may preferably be about 0.3 to 5 mm, typically about 0.5 to 3 mm. When this entering amount is excessively small, there is a possibility that the potential regulating member 8 cannot be stably contacted to the intermediary transfer belt 6.

Here, in the cross section substantially perpendicular to the rotational axis direction of the photosensitive drum 11, a rectilinear line passing through the upstream end A and the downstream end B of the contact surface 83 is defined as a rectilinear line M. At this time, it is preferable that the rectilinear line M is prevented from crossing a line segment CD of the rectilinear line. By this, in the case where the contact surface 83 of the potential regulating member 8 is a flat surface, the intermediary transfer belt 6 and the potential regulating member 8 can be surface-contacted to each other more reliably. In the case where the rectilinear line M crosses the line segment CD of the rectilinear line L, there is a possibility that only either one of end portions of the potential regulating member 8 on the upstream end A side and an end portion of the potential regulating member 8 on the downstream end B side can contact the inner peripheral surface of the intermediary transfer belt 6. In this case, there is a possibility that it becomes difficult to enhance the electric discharge suppressing effect by the surface contact.

Further, in FIG. 6, the potential regulating member 8 is disposed so that the rectilinear line M and the rectilinear line L are substantially parallel to each other, but when the rectilinear line M falls within a range in which the rectilinear line M does not cross the line segment CD of the rectilinear line L, the potential regulating member 8 may be disposed so that the rectilinear line M is inclined relative to the rectilinear line L. For example, the rectilinear line M is inclined relative to the rectilinear line L so that the upstream end A side is closer to the rectilinear line L than the downstream end B side, so that curvature generated on the intermediary transfer belt 6 due to laying of the intermediary transfer belt 6 in the neighborhood of the upstream end A can be made small. Accordingly, this case is advantageous for reduction in possibility of an occurrence of scars on the inner peripheral surface of the intermediary transfer belt 6 due to friction (slide) with the potential regulating member 8.

Incidentally, the contact portion of the potential regulating member 8 contacting the inner peripheral surface of the intermediary transfer belt 6 is not limited to a flat surface. For example, the potential regulating member 8 may be constituted by a curved plate of which a cross section, which is approximately perpendicular to the rotational axis direction of the photosensitive drum 11, is curved and protruded toward the photosensitive drum 11 side, and the contact portion of the potential regulating member 8 contacting the inner peripheral surface of the intermediary transfer belt 6 may be a curved surface protruded toward the photosensitive drum 11 side. As such, by making the contact portion (contact surface) of the potential regulating member 8 contacting the inner peripheral surface of the intermediary transfer belt 6 a curved-surface shape, it becomes possible to reduce stress upon sliding against the intermediary transfer belt 6. By using a roller-shaped potential regulating member 8, the contact portion of the potential regulating member 8 contacting the inner peripheral surface of the intermediary transfer belt 6 may be made curved.

5. Correction Control of the Primary Transfer Bias

Next, a correction control of the primary transfer bias in this embodiment will be described. Incidentally, in this embodiment, the correction control of the primary transfer bias is the same for each primary transfer portion N1*y*, N1*m*, N1*c* and N1*k*, and is synchronized and performed separately for each primary transfer portion N1*y*, N1*m*, N1*c* and N1*k*. Here, one primary transfer portion N1 will be focused and described.

In this Embodiment, the image forming apparatus 1 performs an ATVC (Active-Transfer-Voltage-Control) of the primary transfer portion N1 in order to provide primary transfer current required for the primary transfer of the toner image on the photosensitive drum 11 to the intermediary transfer belt 6 during the image formation. In the ATVC, voltage-current characteristic is acquired using test bias (test voltage and test current) to acquire the primary transfer bias during the image formation corresponding to a total resistance value of the primary transfer portion N1, which is constituted by the photosensitive drum 11, the intermediary transfer belt 6 and the primary transfer roller 15. The ATVC is controlled and performed by the controller 3.

Specifically, predetermined voltage or predetermined current is supplied to the primary transfer roller 15 as the test bias from the primary transfer power source 75 during the non-image formation when there is no toner image in the primary transfer portion N1.

Set values for the predetermined voltage or the predetermined current of the test bias should be one or more levels.

In this Embodiment, three levels of the test bias are supplied to the primary transfer roller 15 with varying the set values. Further, current flowing through the primary transfer roller 15 (primary transfer power source 75) upon supplying the test bias of the predetermined voltage to the primary transfer roller 15, or voltage (output voltage of the primary transfer power source 75) applied to the primary transfer roller 15 upon supplying the test bias of the predetermined current to the primary transfer roller 15, is detected by the current detecting sensor 75*b* or the voltage detecting sensor 75*a*, respectively. By this, it becomes possible to acquire the voltage-current characteristic corresponding to impedance (total resistance value) of the primary transfer portion N1. In addition, based on this voltage-current characteristic, the voltage required to apply the primary transfer current suitable for the primary transfer of the toner corresponding to the impedance (total resistance value) of the primary transfer portion N1 is calculated. Then, during the image formation, the primary transfer bias (here, also referred to as "execution bias") is applied to the primary transfer roller 15 under the constant voltage control with the calculated voltage as target voltage.

In this Embodiment, an appropriate value corresponding to an environment (temperature and humidity), for example, for target current required for the primary transfer of the toner is obtained in advance based on experiments, etc., and stored in the ROM 32. In the ATVC, for example, as a first test bias, current corresponding to the target current corresponding to the environment at that time (e.g., 50 μA) is firstly supplied to the primary transfer roller 15 under a constant current control ((1) in part (a) of FIG. 7). Then, a voltage value applied to the primary transfer roller 15 upon supplying the first test bias to the primary transfer roller 15 is detected (e.g., 1200 [V]). Furthermore, in the ATVC, a second test bias and a third test bias, which are two levels of the test bias increased or decreased by 200 V relative to the voltage value detected when the above first test bias is supplied, are supplied to the primary transfer roller 15 under the constant voltage control ((2) and (3) in part (a) of FIG. 7). Current values flowing through the primary transfer roller 15 upon supplying the second test bias and the third test bias are then detected. From the above three points, the voltage-current characteristic is acquired. In addition, based on the acquired voltage-current characteristic, a voltage value required to flow the target current is calculated, for example, by linear approximation. Incidentally, depending on the configuration of the image forming apparatus 1, etc., the voltage value required to flow the target current may be calculated by curve approximation. The calculated voltage value is then determined as a target voltage of an execution bias Vtr to be applied during the image formation. During the image formation, the execution bias Vtr is applied to the primary transfer roller 15 under the constant voltage control with the calculated voltage value as the target voltage.

Incidentally, the constant current control is a control which adjusts output of a power source so that current supplied to a supply target is approximately constant at a target current. In addition, the constant voltage control is a control which adjusts output of a power source so that voltage applied to an application target is approximately constant at a target voltage.

In addition, in this embodiment, the ATVC is performed during the pre-rotation process (or pre-multi-rotation process) of the job, as the non-image forming time. However, it is not limited thereto, and the ATVC can be performed as long as it is in the non-image forming time, for example, the ATVC may be performed at a predetermined frequency (e.g., at a predetermined number of sheets on which the images are formed) in the sheet interval process during the continuous image formation.

Here, in this embodiment, the potential regulating bias applied to the potential regulating member 8 is controlled under the constant voltage control. In this embodiment, the appropriate value corresponding to the environment (temperature and humidity), for example, for the target voltage of the potential regulating bias is acquired in advance based on experiments, etc., and stored in the ROM 32. During the image formation (or during the ATVC as described below), the potential regulating bias is controlled at the target voltage corresponding to the environment under the constant voltage control. Specifically, the potential regulating bias is set so that suppressing effect to the increase of the charge amount of the toner on the intermediary transfer belt 6, which is changed by the electrical discharge downstream of the primary transfer portion N1, is sufficiently high. Further, the potential regulating bias is set so as to maintain sufficient primary transferability so that primary transfer efficiency is not equal to or lower than a target value due to the current flowing from the primary transfer portion N1 to the potential regulating member 8 or potential difference between the primary transfer bias and the potential regulating bias. In other words, set values for the potential regulating bias which satisfies these conditions are determined in advance by experiments, etc.

However, resistance values of the intermediary transfer belt 6, the primary transfer roller 15, etc. fluctuate due to a temperature and humidity environment in which the image forming apparatus 1 is installed, effects from elevated temperature of the apparatus due to continuous operation of the image forming apparatus 1, etc. By this, there may be a case in which the primary transfer bias or the potential regulating bias deviates from the current or the voltage set as the target, resulting in impairing the primary transferability. Due to effects from individual differences in the respective resistance values of the intermediary transfer belt 6, the primary transfer roller 15, or the potential regulating member 8, the degree of the deviation of the current or the voltage as described above may vary from one image forming apparatus 1 to another, and from one usage condition of the image forming apparatus 1 to another. FIG. 8 is a schematic diagram illustrating current around the primary transfer portion N1. For example, when target current Ia is supplied to the primary transfer roller 15 from the primary transfer power source 75, the target current Ia and a transfer effective current I1 flowing in a direction toward the photosensitive drum 11 are substantially equal if there is no potential regulating member 8. However, by disposing the potential regulating member 8 downstream of the primary transfer portion N1, a current path from the primary transfer roller 15 branches into the transfer effective current I1 and advection current I2 which flows toward the potential regulating member 8. As described above, in the ATVC, the target voltage of the execution bias Vtr to apply the target current corresponding to the total resistance value of the primary transfer portion N1 is determined. At this time, the advection current I2 to the potential regulating member 8 fluctuates by being influenced of the resistance fluctuations as described above, etc. Therefore, if the ATVC is performed without considering this advection current I2 to the potential regulating member 8 or current Ib detected by the current detecting sensor 80*b* of the potential regulating power source 80, the actual transfer effective current I1 may decrease, and the primary transferability may be impaired.

To describe further, as described above, in order to suppress the electric discharge downstream of the primary transfer portion N1, it is effective to arrange the potential regulating member 8, which is the conductive electrode member, downstream of the primary transfer portion N1 and on the inner peripheral surface of the intermediary transfer belt 6, and to apply the bias of the same polarity as the charge polarity of the photosensitive drum 11 to this potential regulating member 8. By this, it becomes possible to suppress the electric discharge downstream of the primary transfer portion N1 by reducing the potential difference between the photosensitive drum 11 and the intermediary transfer belt 6 after the primary transfer. In order to effectively suppress the electric discharge downstream of the primary transfer portion N1 and improve the secondary transferability, it is preferable to bring the potential regulating member 8 closer to the primary transfer portion N1 and set the bias of the same polarity as the photosensitive drum 11 applied to the potential regulating member 8 higher. However, the closer the potential regulating member 8 is brought to the primary transfer portion N1, and the higher the bias applied to the potential regulating member 8 is, the greater the potential difference between the primary transfer portion N1 and the potential regulating member 8 is generated, and the greater leakage current from the primary transfer portion N1 to the potential regulating member 8 becomes. Therefore, the primary transfer current flowing in the direction toward the photosensitive drum 11 in the primary transfer portion N1 decreases, and the primary transferability is impaired. Conversely, the further the potential regulating member 8 is moved away from the primary transfer portion N1 to maintain the primary transferability, and the lower the bias applied to the potential regulating member 8 is, the less the electric discharge suppressing effect downstream of the primary transfer portion N1 becomes, the more difficult it becomes to suppress the increase of the charge amount of the toner, which may impair the secondary transferability. Therefore, to improve the secondary transferability while maintaining the primary transferability, it is desirable to maintain the primary transfer current flowing in the direction toward the photosensitive drum 11 by correcting the primary transfer bias by taking into account the current flowing from the primary transfer portion N1 to the potential regulating member 8.

The correction control of the primary transfer bias in this embodiment will be described using FIG. 9. FIG. 9 is a timing chart diagram illustrating transition of the voltage value and the current value of the primary transfer bias and the potential regulating bias during the execution of the job in this embodiment.

In this embodiment, the controller 3 corrects the primary transfer bias upon executing the ATVC of the primary transfer portion N1 in the pre-rotation process of the job. In this embodiment, the controller 3 detects the current value flowing through the potential regulating member 8 (potential regulating power source 80) in a state in which the potential regulating bias is applied to the potential regulating member 8 in the pre-rotation process of the job, while the test bias is not applied to the primary transfer roller 15, and while the test bias is applied to the primary transfer roller 15. Then, the controller 3 corrects the primary transfer bias based on these detected current values.

When the job is started, drive of the intermediary transfer belt 6 is initiated to start the pre-rotation process (T1). Thereafter, application of the potential regulating bias under the constant voltage control from the potential regulating power source 80 to the potential regulating member 8 is initiated (T2). In this embodiment, target voltage Vb of the potential regulating bias at this time is set to predetermined voltage according to the same environment as during the image formation (e.g., Vb=−3000 V). Then, before the test bias is applied to the primary transfer roller 15, a current value Ib1 flowing through the potential regulating member 8 is detected by the current detecting sensor 80*b* (for example, Ib1=−5 μA).

Thereafter, the ATVC is initiated to apply the test bias (the first test bias described above) from the primary transfer power source 75 to the primary transfer roller 15 under the constant current control aiming at target current I1 (e.g., I1−50 μA) (T3). The target current I1 at this time should be corresponding to target current of the primary transfer bias during the image formation according to the environment. Further, the execution bias Vtr (e.g., Vtr=1200 V) is determined as described above. Incidentally, as described above, in this embodiment, three levels of the test bias are applied to the primary transfer roller 15 in the ATVC; however, in FIG. 9, only the test bias under the constant current control aiming at the target current during the image formation is illustrated for simplicity's sake. The execution bias Vtr is determined by the application of the above test bias; however, the execution bias Vtr determined here is affected by fluctuations in the current value Ib1 flowing to the potential regulating member 8 due to the resistance fluctuations in the intermediary transfer belt 6, etc., as described above. As a result, the target current Ia and the actual transfer effective current I1 may deviate.

Therefore, in this embodiment, a current value Ib2 flowing through the potential regulating member 8 is detected by the current detecting sensor 80*b* when the test bias (the first test bias described above) is applied to the primary transfer roller 15 (for example, Ib2=−10 μA). In addition, difference ΔI (=|Ib1−Ib2|) between the current value Ib1 detected while the test bias is not applied to the primary transfer roller and the current value Ib2 detected while the test bias is applied to the primary transfer roller 15 is acquired (e.g., ΔI=5 μA). In this embodiment, this difference ΔI is regarded as the advection current I2 described above, and the target current Ia is determined by adding this difference ΔI to the target current I1 of the above test bias. In addition, corrected execution bias Vtr' (e.g., Vtr'=1500 V) corresponding to that target current Ia is determined based on the voltage-current characteristic acquired in the ATVC. In other words, the execution bias Vtr' can be determined based on the voltage-current characteristic of a case in which the potential regulating member 8 is present, which is shown by a solid line in part (b) of FIG. 7, corresponding to the voltage-current characteristic of a case in which the potential regulating member 8 is not present, which is shown by a broken line in part (b) of FIG. 7.

During the image formation, the determined corrected execution bias Vtr' is applied to the primary transfer roller 15 under the constant voltage control (T4 to T5).

Incidentally, in this embodiment, since the primary transfer bias is controlled under the constant voltage control, the voltage value corresponding to the target current Ia is determined; however, it is not limited thereto. For example, in a case in which the primary transfer bias is controlled under the constant current control, the target current Ia should be determined as described above, and the primary transfer bias should be controlled under the constant current control at the determined target current Ia during the image formation. By this as well, correction of the primary transfer bias with taking into account the fluctuation of the current flowing through the potential regulating member 8 becomes possible. In the case in which the primary transfer bias is controlled under the constant current control, for example, an initial voltage value of the primary transfer bias during the image formation, etc., can be determined by the ATVC. Further, the primary transfer bias may be controlled under both the constant voltage control and the constant current control.

Further, in this embodiment, as the current flowing through the potential control member 8 while the test bias is applied, the current while the first test bias described above is applied is detected, however, it is not limited thereto. For example, the execution bias Vtr corresponding to the target current, which is determined based on the voltage-current characteristic acquired by applying multiple levels of the test bias, may be applied again as the test bias, and the current flowing through the potential regulating member 8 at that time may be detected.

Next, a procedure for the correction control of the primary transfer bias in this embodiment will be described using FIG. 10. FIG. 10 is a flowchart diagram outlining a job procedure in this embodiment.

When the controller 3 starts the job (S1), the controller 3 starts the application of the predetermined voltage under the constant voltage control from the potential regulating power source 80 to the potential regulating member 8 and detects the current Ib1 flowing through the potential regulating member 8 by the current detecting sensor 80*b* (S2). Next, the controller 3 applies the test bias to the primary transfer roller 15 from the primary transfer power source 75 (S3) and determines the execution bias Vtr based on the acquired voltage-current characteristic of the primary transfer portion N1 (S4). That is, the controller 3 determines the execution bias Vtr based on the voltage-current characteristic of the primary transfer portion N1 acquired in the state in which the predetermined voltage according to the environment is applied to the potential regulating member 8 (S4). In addition, in S4, the current Ib2 flowing through the potential regulating member 8 when the test bias (test bias controlled under the constant current at the target current I1) is applied to the primary transfer roller 15 in the state in which the predetermined voltage is applied to the potential regulating member 8 is detected by the current detecting sensor 80*b*. Next, the controller 3 calculates the difference (current change) ΔI (=|Ib1−Ib2|) between the current Ib1 and the current Ib2 (S5). Then, the controller 3 determines the target current Ia by adding ΔI to the above target current I1 (S6). Next, the controller 3 determines the corrected execution bias Vtr' corresponding to the target current Ia based on the above voltage-current characteristic of the primary transfer portion N1 (S7). That is, the controller 3 determines the corrected execution bias Vtr' corresponding to the target current Ia based on the voltage-current characteristic of the primary transfer portion N1 acquired in the state in which the predetermined voltage is applied to the potential regulating member 8 (S7). Then, the controller 3 applies the corrected execution bias Vtr' to the primary transfer roller 15 under the constant voltage control to perform the normal image forming operation (S8) and terminates the job (S9).

Thus, in this embodiment, the image forming apparatus 1 comprising: the photosensitive member (photosensitive drum) 11, which can be charged to predetermined polarity and configured to bear the toner image; the intermediary transfer belt 6, which can be circularly moved, configured to convey the toner image, which is primarily transferred from the photosensitive member 11 in the primary transfer portion N1, to secondarily transfer to the recording material S in the secondary transfer portion N2; the primary transfer member (primary transfer roller) 15 configured to form the primary transfer portion N1 where the photosensitive member 11 and the intermediary transfer belt 6 are in contact with each other by contacting the inner peripheral surface of the intermediary transfer belt 6, and to transfer the toner image onto the intermediary transfer belt 6 from the photosensitive member 11; the first applying portion (primary transfer power source) 75 configured to apply the bias of the opposite polarity to the predetermined polarity to the primary transfer member 15; the electrode member (potential regulating member) 8 in contact with the inner peripheral surface of the intermediary transfer belt 6 on the downstream side of the primary transfer portion N1 with respect to the moving direction of the intermediary transfer belt 6; the second applying portion (potential regulating power source) 80 configured to apply the bias of the same polarity as the predetermined polarity to the electrode member 8; the detecting portion (in this embodiment, current detecting sensor) 80*b* configured to detect the current flowing through the electrode member 8; and the controller 3 configured to execute the setting operation (ATVC) in which the transfer bias, which is applied from the first applying portion 75 to the primary transfer member 15 during the image formation, is set by causing the first applying portion 75 to apply the test bias to the primary transfer member 15, and in executing the setting operation, the controller 3 acquires the first detecting result by the detecting portion 80*b* while the voltage is applied to the second applying portion 80 but the test bias is not applied to the primary transfer member 15, acquires the second detecting result by the detecting portion 80*b* while the voltage is applied to the second applying portion 80 and the test bias is applied to the primary transfer member 15, and sets the transfer bias based on the first detecting result and the second detecting result.

In this embodiment, in executing the setting operation, the controller 3 acquires the first detecting result while the bias of the same polarity as the predetermined polarity is applied from the second applying portion 80 to the electrode member 8 under the constant voltage control, and acquires the second detecting result while the predetermined bias is applied from the second applying portion 80 to the electrode member 8 under the constant voltage control. In this embodiment, the controller 3 performs the constant voltage control so that the predetermined bias is applied from the second applying portion 80 to the electrode member 8 during the image formation. Further, in this embodiment, the controller 3 acquires the second detecting result after acquiring the first detecting result. In addition, in this embodiment, the image forming apparatus 1 further comprising the other detecting portion (voltage detecting sensor 75*a*, current detecting sensor 75*b*) configured to detect the current flowing through the primary transfer member 15 or the voltage applied to the primary transfer member 15, and the controller 3, in the setting operation, sets the target voltage of the transfer bias based on the voltage-current characteristic acquired based on the detecting results by the other detecting portion (75*a*, 75*b*) while the test bias is applied from the first applying portion 75 to the primary transfer member 15, the target current of the transfer bias set in advance, and the difference between the first detecting result and the second detecting result. Further, in the setting operation, the controller 3 may be configured to set the target current of the transfer bias based on the target current of the transfer bias set in advance and the difference between the first detecting result and the second detecting result.

In particular, in this embodiment, the second applying portion (potential regulating power source) 80 applies the bias of the same polarity as the predetermined polarity to the electrode member 8 under the constant voltage control, and the detecting portion 80*b* detects the current flowing through the electrode member 8. Then, in particular, in this embodiment, the controller 3, in executing the setting operation, acquires the first detecting result by the detection portion 80*b* while the test bias is not applied to the primary transfer member 15 while maintaining the output voltage of the second applying portion 80 substantially constant, acquires the second detecting result by the detecting portion 80*b* while the test bias is applied to the primary transfer member 15 while maintaining the output voltage of the second applying portion 80 substantially constant, and sets the transfer bias based on the first detecting result and the second detecting result. Incidentally, maintaining the output voltage substantially constant includes a case in which the output voltage is controlled so as to be close to the predetermined target value, and also a case in which the output voltage fluctuates in degree within a range of error.

As described above, according to this embodiment, both maintaining of the primary transferability with ensuring the target current required for the primary transfer and the improvement of the secondary transferability by effectively suppressing the electric discharge downstream of the primary transfer portion N1 with the predetermined potential regulating bias become possible.

Embodiment 2

Next, another embodiment of the present invention will be described. The basic configuration and operation of the image forming apparatus in this embodiment are the same as those of the image forming apparatus in the Embodiment 1. Therefore, in the image forming apparatus of this embodiment, with respect to elements having functions or configurations that are the same as or corresponding to the image forming apparatus of the Embodiment 1 will be labeled with the same reference numerals as in the Embodiment 1, and detailed description will be omitted.

In the Embodiment 1, the test bias is applied to the primary transfer roller 15 after the potential regulating bias is applied to the potential regulating member 8, however, the present invention is not limited to this configuration.

For example, it is possible to apply the test bias to the primary transfer roller first, then apply the potential regulating bias to the potential regulating member 8 and correct the primary transfer bias by determining change in the current flowing through the potential regulating member 8. An example will be described below.

FIG. 11 is a timing chart diagram illustrating transition of the voltage value and the current value of the primary transfer bias and the potential regulating bias during the execution of the job in this embodiment. When the job is started, the drive of the intermediary transfer belt 6 is initiated to start the pre-rotation process (T1). Then, the ATVC is initiated to apply the test bias from the primary transfer power source 75 to the primary transfer roller 15 under the constant current control aiming at the target current I1, and the execution bias Vtr is determined as described in the Embodiment 1 (T2). Further, at this time, the constant voltage control is performed so that the output voltage of the potential regulating power source 80 is 0 V, and the current value Ib2 induced by the application of the test bias and flowing through the potential regulating member 8 is detected by the current detecting sensor 80*b*. Incidentally, as described in the Embodiment 1, three levels of the test bias are applied to the primary transfer roller 15 in the ATVC, however, in FIG. 11, only the test bias under the constant current control aiming at the target current during the image formation is illustrated for simplicity's sake. Thereafter, the application of the test bias is terminated, and the application of the potential regulating bias under the constant voltage control from the potential regulating power source 80 to the potential regulating member 8 is initiated (T3). The target voltage Vb of the potential regulating bias at this time is set to the predetermined voltage according to the environment similar to that of during the image formation. Then, the current value Ib1 flowing through the potential regulating member 8 is detected by the current detecting sensor 80*b*.

Thereafter, the difference ΔI (=|Ib1−Ib2|) between the current value Ib1 detected while the test bias is not applied to the primary transfer roller 15 and the current value Ib2 detected while the test bias is applied to the primary transfer roller 15 is determined. Then, this difference ΔI is regarded as the advection current I2 described above, and the target current Ia is determined by adding this difference ΔI to the target current I1 during the application of the above test bias. Further, the execution bias Vtr', which is corrected to correspond to the target current Ia, is determined based on the voltage-current characteristic acquired by the ATVC. During the image formation, the determined corrected execution bias Vtr' is applied to the primary transfer roller 15 under the constant voltage control (T4 to T5).

Thus, in this embodiment, the controller 3, in executing the setting operation (ATVC), acquires the second detecting result by the detecting portion (current detecting sensor) 80*b* while the test bias is applied to the primary transfer member 15 while maintaining the output voltage of the second applying portion (potential regulating power source) 80 at approximately 0 V, and acquires the first detecting result by the detecting portion 80*b* while the test bias is not applied to the primary transfer member while applying the predetermined bias of the same polarity as the predetermined polarity (charge polarity of the photosensitive member 11) from the second applying portion 80 to the electrode member 8 under the constant voltage control. In addition, in this embodiment, the controller 3 acquires the first detecting result after acquiring the second detecting result.

As described above, according to the control of this embodiment, the same effect as in the Embodiment 1 can be obtained.

[Others]

As described above, the present invention has been described according to the specific embodiments, however, the present invention is not limited to the above embodiments.

In the embodiments described above, the potential regulating member (electrode member), of which the contact surface contacting the intermediary transfer belt is flat surface, is the plate-shaped member formed of the metal plate or the like, however, it may also be in other forms, such as a block-shaped member having a rectangular cross section, for example, as long as a similar contact surface is formed. The same applies to the potential regulating member (electrode member) of which contact surface contacting the intermediary transfer belt is the curved surface.

In addition, the image forming apparatus is not limited to the image forming apparatus capable of forming the full color images, but may also be an image forming apparatus capable of forming only monochrome (black and white or monochrome) images.

Further, in the above-described embodiments, the predetermined charge polarity of the photosensitive member is the negative polarity, however, it is not limited thereto. The predetermined charge polarity of the photosensitive member may also be the positive polarity. Similarly, in the above-described embodiments, the normal charge polarity of the toner is the negative polarity, but may also be the positive polarity. Various applied voltages in the case where the predetermined charge polarity of the photosensitive member and the normal charge polarity of the toner are the positive polarity may only be required to be appropriately changed such that these polarities are changed to the polarity opposite to the polarity in the above-described embodiments in accordance with the above-described embodiments.

In addition, in the above Embodiments, the potential regulating member (electrode member) is controlled under the constant voltage control during the image formation, however, it may also be controlled under the constant current control. In this case, the primary transfer bias may be determined based on the detected voltage in the case in which the test bias is applied to the primary transfer member during the ATVC and in the case in which the test bias is not applied to the primary transfer member.

In addition, in the embodiments described above, the difference ΔI (=|Ib1−Ib2|) between the current value Ib1 detected while the test bias is not applied to the primary transfer roller and the current value Ib2 detected while the test bias is applied to the primary transfer roller 15 is considered as the advection current I2, however, it is not limited thereto. For example, the target current of the primary transfer current may be corrected by considering the current value Ib2 itself detected while the test bias is applied to the primary transfer roller 15 as the advection current.

In addition, in the embodiments described above, the target value of the primary transfer bias is set based on the detecting result by the detecting portion (current detecting sensor) 80*b* while the test bias is applied to the primary transfer member, however, it is not limited thereto. For example, the target value of the primary transfer bias may be set based on the detecting result by the detecting portion (voltage detecting sensor) 80*a* while the test bias is applied to the primary transfer member.

In addition, the photosensitive member is not limited to the drum-shaped photosensitive member (photosensitive drum), but may also be an endless-belt-shaped photosensitive member (photosensitive belt), etc.

According to the present invention, in the configuration in which the bias of the same polarity as the charge polarity of the photosensitive member is applied to the electrode member disposed downstream of the primary transfer portion, the secondary transferability can be improved while maintaining the primary transferability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-027857 filed on Feb. 25, 2023, which is hereby incorporated by reference herein in its entirety.

What is claimed is:

1. An image forming apparatus comprising:

a photosensitive member charged to a predetermined polarity and configured to bear a toner image;

an intermediary transfer belt in contact with the photosensitive member at a primary transfer portion and on which the toner image is primary-transferred in the primary transfer portion from the photosensitive member, the primary-transferred toner image being secondary-transferred in a secondary transfer portion;

a primary transfer member configured to contact an inner peripheral surface of the intermediary transfer belt, and to transfer the toner image onto the intermediary transfer belt from the photosensitive member by a transfer bias being applied;

an electrode member disposed on an inner peripheral surface side of the intermediary transfer belt, and downstream of a downstream end of the primary transfer portion and upstream of the secondary transfer portion with respect to a rotational direction of the intermediary transfer belt;

a first applying portion configured to apply a bias of an opposite polarity to the predetermined polarity to the primary transfer member;

a second applying portion configured to apply a bias of the same polarity as the predetermined polarity to the electrode member;

a first detecting portion configured to detect a current flowing through or a voltage applied to the primary transfer member;

a second detecting portion configured to detect a current flowing through or a voltage applied to the electrode member; and a control portion configured to execute, during non-image formation, a setting operation in which the transfer bias to be applied during image formation is set by causing the first applying portion to apply a test bias to the primary transfer member, wherein in executing the setting operation, the control portion sets the transfer bias based on a first detecting result detected by the first detecting portion while the test bias is applied to the primary transfer member and a second detecting result detected by the second detecting portion in the setting operation.

2. An image forming apparatus according to claim 1, wherein the second detecting result includes a first detected value and a second detected value, and, in executing the setting operation, the control portion sets the transfer bias based on the first detected value obtained while a predetermined regulating voltage is applied to the electrode member by the second applying portion and a predetermined voltage is applied to the primary transfer member, and on the second detected value, obtained while the predetermined regulating voltage is applied to the electrode member by the second applying portion and no voltage is applied to the primary transfer member.

3. An image forming apparatus according to claim 2, wherein the first detecting result is detected by the first detecting portion during a period when the predetermined regulating voltage is applied to the electrode member.

4. An image forming apparatus according to claim 3, wherein the predetermined regulating voltage is a voltage applied to the electrode member during the image formation.

5. An image forming apparatus comprising:
a photosensitive member charged to a predetermined polarity and configured to bear a toner image;
an intermediary transfer belt in contact with the photosensitive member and on which the toner image is primary-transferred in a primary transfer portion from the photosensitive member, the primary-transferred toner image being secondary-transferred in a secondary transfer portion;
a primary transfer member configured to contact an inner peripheral surface of the intermediary transfer belt, and to transfer the toner image onto the intermediary transfer belt from the photosensitive member by a transfer bias being applied;
an electrode member disposed on an inner peripheral surface side of the intermediary transfer belt, and downstream of a downstream end of the primary transfer portion and upstream of the secondary transfer portion with respect to a rotational direction of the intermediary transfer belt;
a first applying portion configured to apply a bias of an opposite polarity to the predetermined polarity to the primary transfer member;
a second applying portion configured to apply a bias of the same polarity as the predetermined polarity to the electrode member;
a detecting portion configured to detect a current flowing through or a voltage applied to the primary transfer member; and p1 a control portion configured to execute, during non-image formation, a setting operation in which the transfer bias to be applied during image formation is set by causing the first applying portion to apply a test bias to the primary transfer member,
wherein in executing the setting operation, the control portion sets the transfer bias based on a detecting result detected by the detecting portion when the test bias is applied to the primary transfer member or a test current is caused to flow through the primary transfer member by the first applying portion in a state in which the control portion causes the second applying portion to apply a predetermined regulating voltage to the electrode member.

6. An image forming apparatus according to claim 5, wherein a value of the predetermined regulating voltage is set in advance based on an environment.

7. An image forming apparatus according to claim 5, wherein the predetermined regulating voltage is a voltage applied to the electrode member during the image formation.

8. An image forming apparatus according to claim 5, further comprising a second detecting portion configured to detect a current flowing through or a voltage applied to the electrode member,
wherein in executing the setting operation, the control portion sets the transfer bias based on a detecting result detected by the second detecting portion during a period when the predetermined regulating voltage is applied to the electrode member.

* * * * *